United States Patent [19]
Shimizu et al.
[11] Patent Number: 5,035,410
[45] Date of Patent: Jul. 30, 1991

[54] JIG AND JIG ARRANGEMENT

[75] Inventors: Norihiko Shimizu, Aichi; Kanji Sato, Chiba; Toru Saiki, Aichi; Kunio Goto, Gifu; Masuo Matsubara; Hiroshi Wada, both of Gifu, all of Japan

[73] Assignees: Yamazaki Mazak Kabushiki Kaisha, Aichi; Kabushiki Kaisha Imao Kooporeishon, Gifu, both of Japan

[21] Appl. No.: 481,560

[22] Filed: Feb. 20, 1990

[30] Foreign Application Priority Data

Feb. 17, 1989 [JP] Japan .................................. 1-37836
Jul. 7, 1989 [JP] Japan .................................. 1-76487

[51] Int. Cl.[5] .............................................. B23Q 3/02
[52] U.S. Cl. ..................................... 269/136; 269/309
[58] Field of Search .................. 269/309, 310, 74, 66, 269/136, 69-70, 63, 229, 231, 232, 234, 236, 900, 93, 20, 47, 48.1; 198/545

[56] References Cited

U.S. PATENT DOCUMENTS

| | | | |
|---|---|---|---|
| 3,804,398 | 4/1974 | Bonzi | 269/232 |
| 4,382,589 | 5/1983 | Cammi | 269/309 |
| 4,500,079 | 2/1985 | Morghen | 269/309 |
| 4,738,439 | 4/1988 | Satake | 269/309 |
| 4,881,727 | 11/1989 | Nemirovsky | 269/309 |
| 4,932,642 | 6/1990 | Salenbien et al. | 269/309 |

*Primary Examiner*—Robert C. Watson
*Attorney, Agent, or Firm*—Wenderoth, Lind & Ponack

[57] ABSTRACT

A jig has a main body. The main body is provided with a rotatable engaging shaft. The engaging shaft is provided with a main body fixing portion actuator and a workpiece clamping portion actuator. The main body fixing portion actuator is provided with a main body fixing portion drivable by the main body fixing portion actuator. The workpiece clamping portion actuator is provided with a workpiece clamping portion drivable forward and backward by the workpiece clamping portion actuator. When the engaging shaft is rotated, attachment and detachment of the main body and clamping of a workpiece can be performed.

18 Claims, 10 Drawing Sheets

JIG AND JIG ARRANGEMENT

BACKGROUND OF THE INVENTION

This invention relates to a jig and jig arrangement to be used when it is required to clamp a workpiece on a base plate or the like in a machine tool, such as a machining center and a milling machine.

When a workpiece is installed on a base plate or the like by using this kind of jig in a conventional method, first a jig is installed and fixed on a base plate by a bolt, and second a workpiece is fixed by working a clamp by a bolt.

However, it is necessary that this kind of conventional jig has many parts for fastening the bolt for the jig. Therefore, when multiple workpieces are clamped, the arrangement operations require much labor and time, resulting in inconvenience. In a method of easily attaching and detaching a workpiece with a hydraulic clamp system, it is impossible to change the position of the jig on the base plate due to the limitations of the arrangement of the hydraulic oil pipes. As a result, the jig is applied to only a workpiece. That is, a conventional jig is for exclusive use.

SUMMARY OF THE INVENTION

In consideration of the above-described circumstances, the object of the present invention is to provide a jig and jig arrangement with which the attachment or detachment of a jig on or from base plate and attachment and detachment of a workpiece can be easily executed in a short time.

The present invention provides a main body. The main body is provided with a rotatably engaging shaft. The engaging shaft is provided with a main body fixing portion acting means and a workpiece clamping portion acting means. The main body fixing portion acting means is provided with a main body fixing portion drivable thereby. The workpiece clamping portion acting means is provided with a workpiece clamping portion drivable forward and backward thereby.

According to the above-described arrangement, when the engaging shaft is rotated, the main body fixing portion is worked by the main body fixing portion acting means. Then the main body is fixed on a base plate or the like. At the same time, the workpiece clamping portion moves forward and backward by the workpiece clamping portion acting means so as to clamp a workpiece. Therefore, the fixing of a jig on a base plate or the like and clamping of a workpiece can be easily executed at the same time without using a separate fastening means, such as a bolt. The attachment or detachment of the jig on or from a base plate and the attachment or detachment of a workpiece can be easily and readily executed so as to execute arrangement operations in a short time. Furthermore, since hydraulic pressure isn't used, a jig can be moved without difficulty and the jig can be applied to various kinds of workpieces.

The present invention provides a main body having an installation reference plane. The main body is rotatably provided with a cam shaft. The main body is also provided with clamping means for clamping a workpiece free to project and recede while engaging with the cam shaft. The main body has a main body fixing unit operation body rotatable and movable through a screw mechanism. The main body also has a main body fixing unit for fixing the main body, drivable by means of the main body fixing unit operation body. Furthermore, a clutch shaft is provided so as to engage with the cam shaft and the main body fixing unit operation body selectively, and so as to be rotatable with an axis perpendicular to the installation reference plane as its center.

With the above-described arrangement, the rotation motion of the clutch shaft is converted into the linear motion of the main body fixing unit operation body by means of the screw mechanism. The jig is then fixed on the base plate. Furthermore, the rotation motion of the clutch shaft is converted into the linear motion of the clamping means by means of the cam shaft to clamp a workpiece. Therefore, the fixing of a jig on a base plate or the like, and the clamping of a workpiece, can be executed by working one clutch shaft, without a separate fastening means such as a bolt. Furthermore, since the clutch shaft is rotated with an axis perpendicular to the installation reference plane as its center, a wrench or the like for working the clutch shaft doesn't interfere with the base plate or the like. Accordingly, attachment or detachment of the jig on or from the base plate and attachment or detachment of the workpiece can be easily executed, and arrangement operations can be executed in a short time without difficulty. Since hydraulic pressure isn't used, the jig can be easily moved. Furthermore, the jig can be applied to various kinds of workpieces for various purposes.

With an arrangement having a holding groove on the circumferential face of the main body, a robot hand or the like can be engaged with the holding groove. Therefore, the exchange or delivery of jigs can be automatically executed without any hand, in the same way as the ATC of a machining center. Accordingly, it is possible to achieve complete automization of a plant by automating the manual arrangement operations.

The present invention provides a base plate and a workpiece fixing apparatus. On a mounting face of the base plate, a plurality of mounting holes are formed. The workpiece fixing apparatus is provided with a workpiece installation reference portion. At the opposite side of the workpiece installation reference portion of the workpiece fixing apparatus, a mounting portion capable of fitting in the mounting holes is provided. The workpiece fixing apparatus is rotatably provided with an engaging shaft. The mounting portion of the workpiece fixing apparatus is provided with mounting means so as to be engageable with and removable from the mounting hole. Actuating means is provided between the engaging shaft and the mounting means.

With the above-described arrangement, the mounting means is worked by the rotation of the engaging shaft through the actuating means, and the workpiece fixing apparatus is installed and fixed on the base plate through the mounting means and the mounting hole. That is, since a bolt or the like isn't used, attachment or detachment of the workpiece fixing apparatus on or from the base plate can be easily executed. As a result, arrangement operations can be executed in a short time without any difficulty, even in the case where it is required to install and fix many workpiece fixing apparatuses on a base plate, such as in the case where it is required to fix multiple workpieces.

DESCRIPTION OF THE PREFERRED EMBODIMENTS

Figure 1:
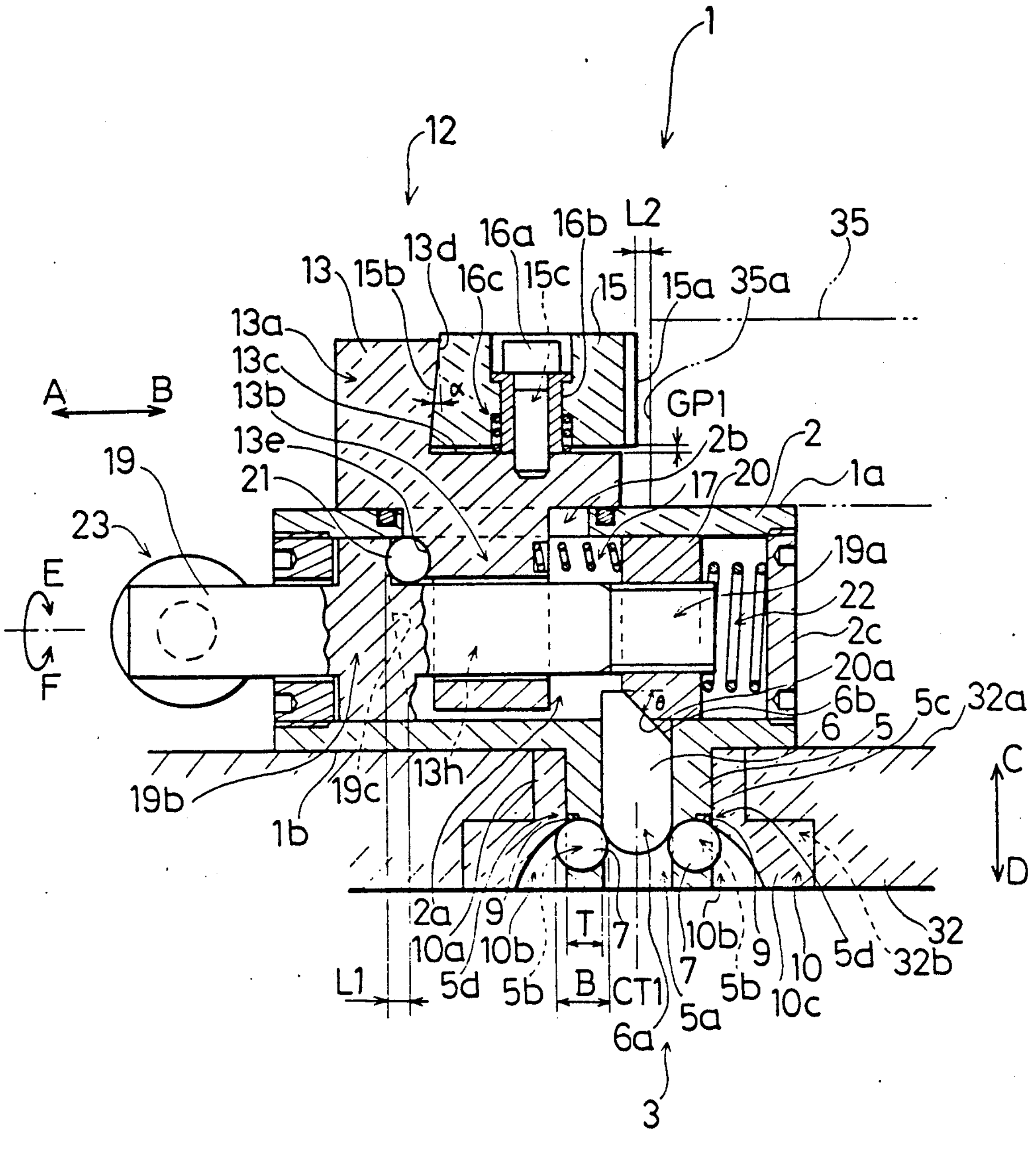
FIG. 1 is a sectional view showing a first embodiment of a jig according to the present invention.
Figure 2:
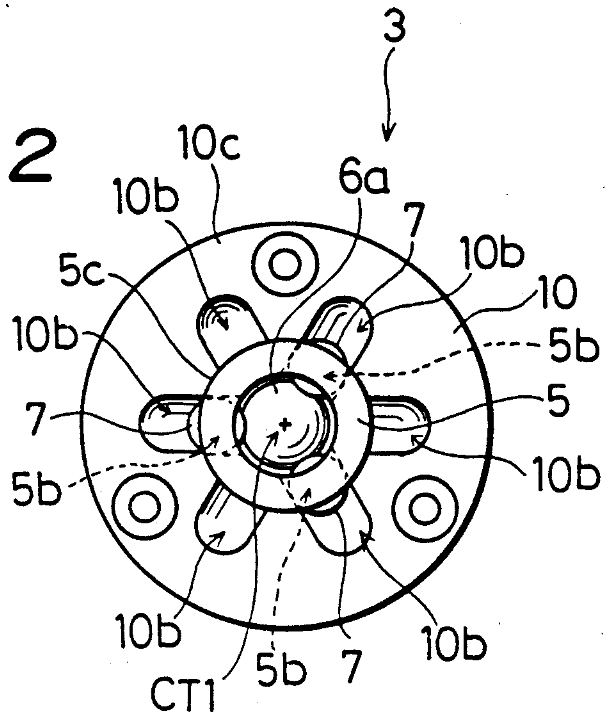
FIG. 2 is a bottom view of FIG. 1.
Figure 4:
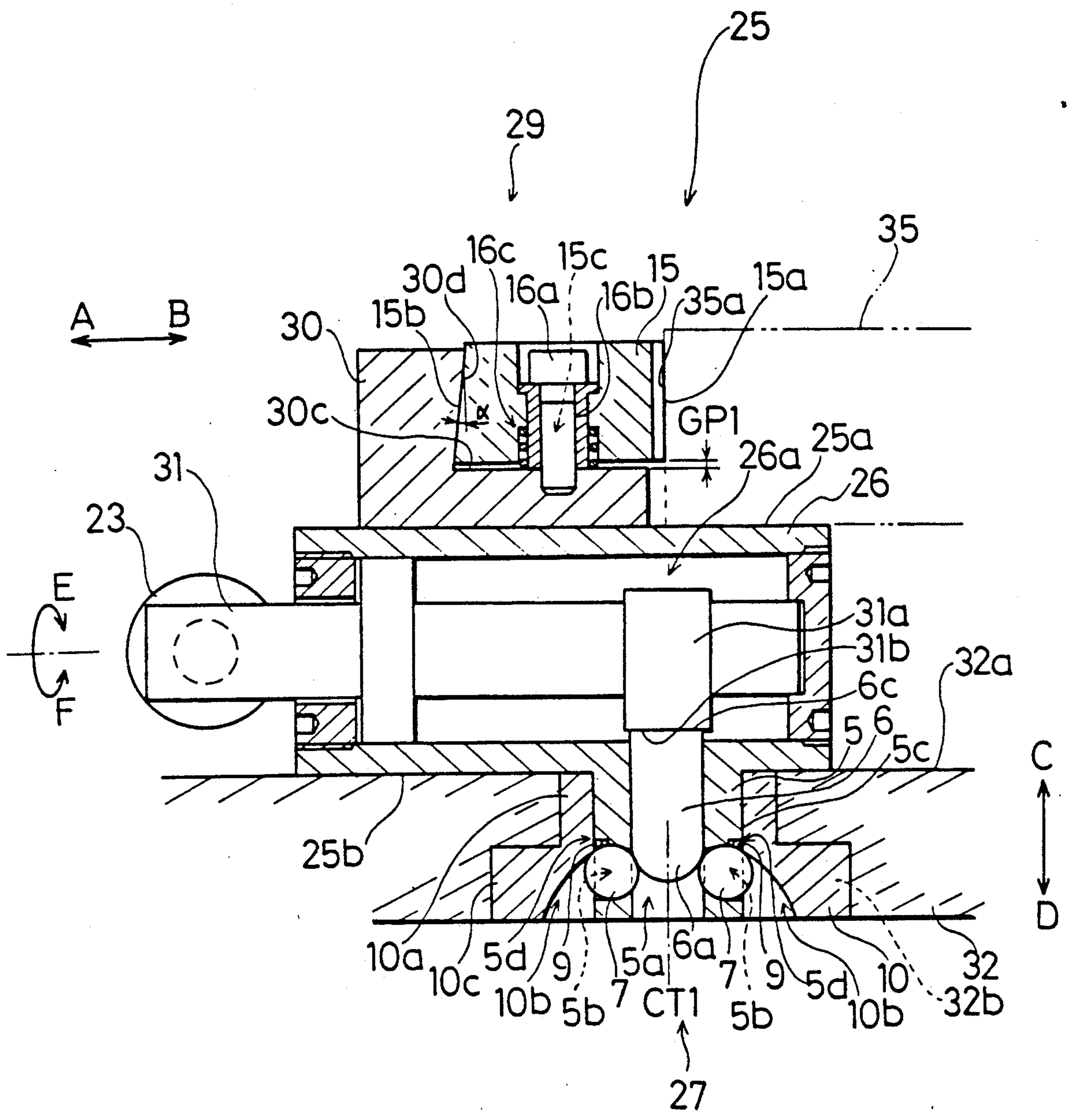
FIG. 4 is a sectional view showing another example of a jig.
Figure 5:
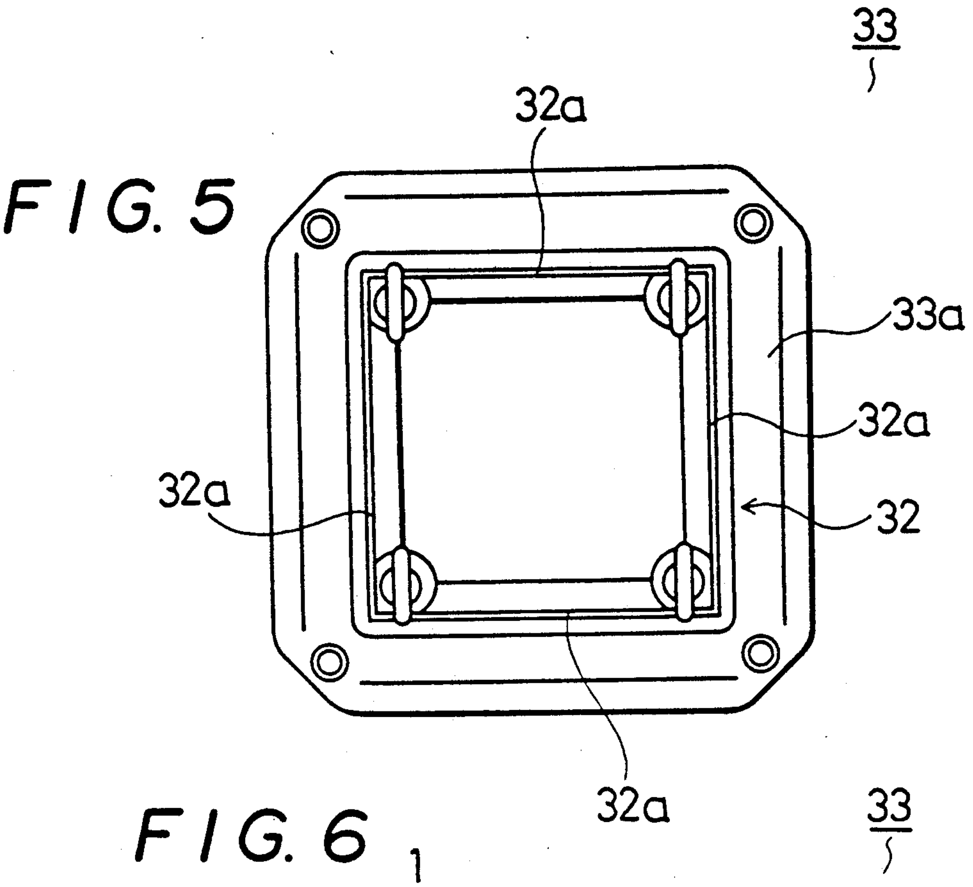
FIG. 5 is a top view showing an example of a jig tool for which a jig according to the present invention is used.
Figure 6:
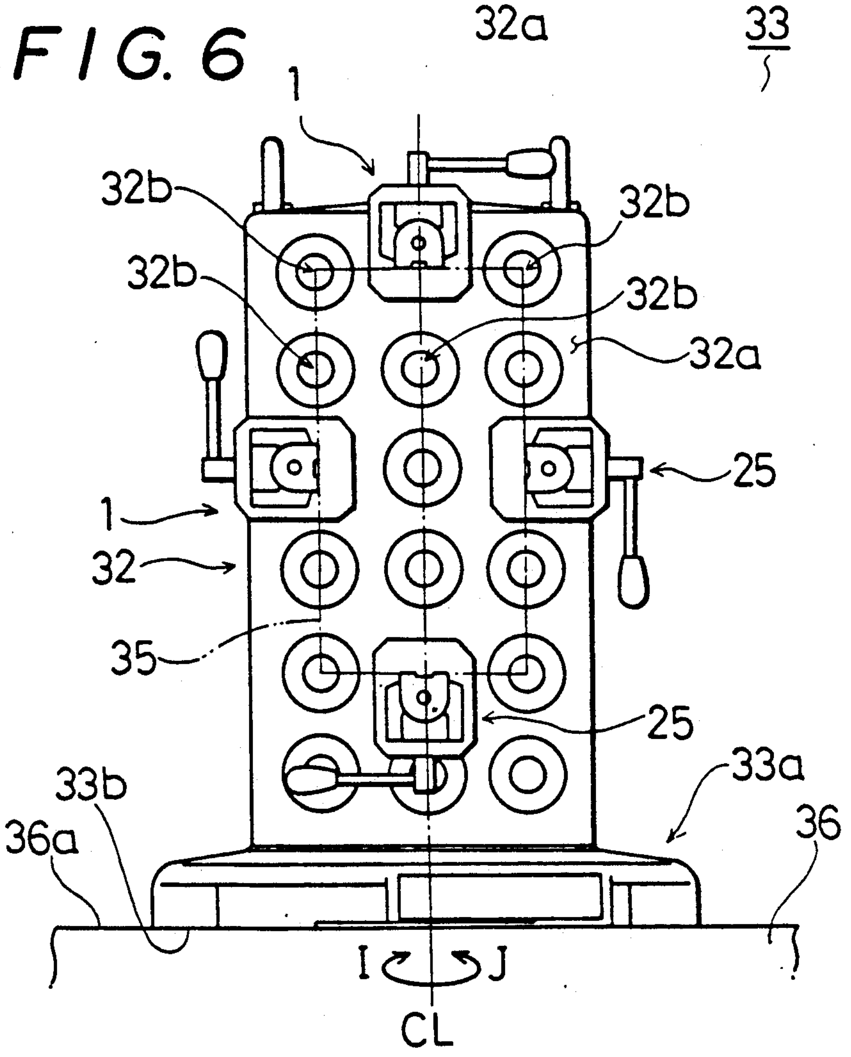
FIG. 6 is a front elevation of the jig tool as shown in FIG. 5 with jigs according to the present invention fixed thereto.
Figure 7:
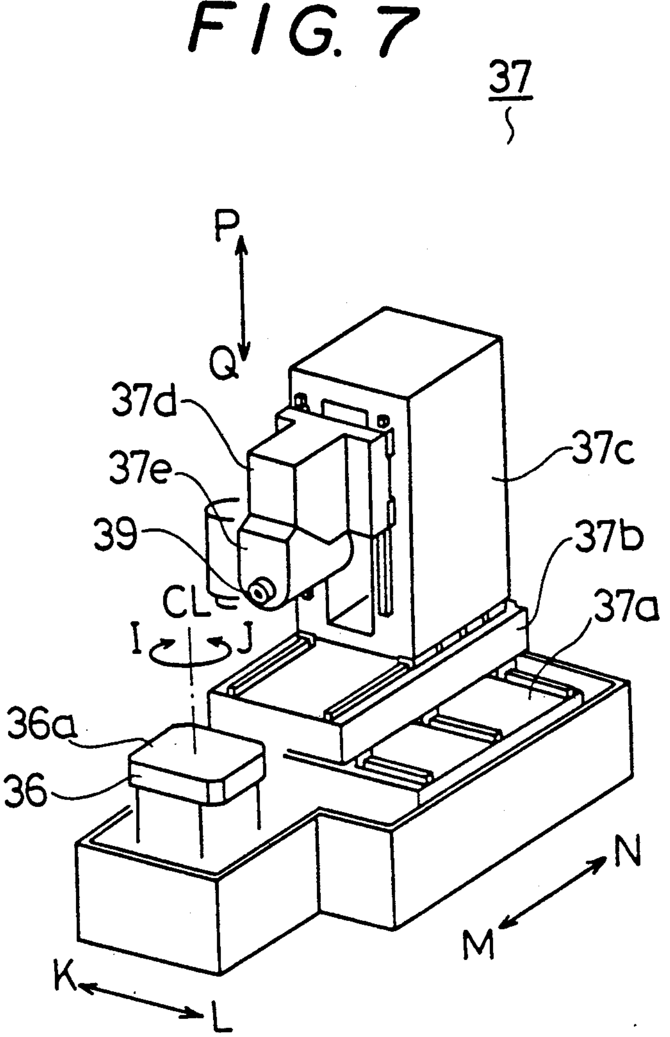
FIG. 7 is a perspective view showing an example of a machine tool using the jig tool on which a jig according to the present invention is used.

A machine tool 37, such as a machining center as shown in FIG. 7 has a frame 37*a*. On the frame 37*a*, a base 37*b* is provided to be movable in the directions of the arrows K and L. On the base 37*b*, a column 37*c* is provided to be movable in the directions of the arrows M and N. The column 37*c* is provided with a spindle stock 37*d* movable in the directions of the arrows P and Q. The spindle stock 37*d* is provided with a head 37*e*. The head 37*e* is provided with a spindle 39. At the frame 37*a*, a table 36 is rotatably provided in the directions of the arrows I and J in the figure around a rotation center axis CL. At the upper portion of the table 36 in the figure, a jig mounting face 36*a* is provided, perpendicular to the rotation center axis CL. On the jig mounting face 36*a* of the table 36, a jig tool 33 is fixed with bolts or the like, free to be attached and detached, so that a center axis of the jig tool 33 can correspond to the rotation center axis CL of the table 36 and in such a manner that a mounting face 33*b* of a table fixing portion 33*a*, provided at the lower portion of the jig tool 33 in the figure, is abutted on the jig mounting face 35*a*, as shown in FIG. 6. The jig tool 33 is provided with a base plate 32 at the upper portion of the table fixing portion 33*a* in FIG. 6. The base plate 32 is formed in a cylindrical/square shape in section, as shown in FIG. 5. Workpiece fixing faces 32*a* are formed at the four faces outside the base plate 32. Each workpiece fixing face 32*a* can face the spindle stock 39 with which the machine tool 37 is provided by rotating the table 36 around the rotation center axis CL in the directions of the arrows I and J in the figure. At each workpiece fixing face 32*a*, a plurality of jig mounting holes 32*b*, in cylinder form, are provided, lining up vertically and horizontally, with their axis centers perpendicular to the workpiece fixing face 32*a* and so as to penetrate the base plate 32, as shown in FIG. 6. A fixed bush 10 is inserted and installed in each jig mounting hole 32*b* from the opposite side of the workpiece fixing face 32*a*, that is, from the lower portion of FIG. 1 or 4. The fixed bush 10 has a cylindrical portion 10*a*, whose outer diameter is equal to the inside diameter of the jig mounting hole 32*b*, as shown in FIGS. 1, 2 or 4. Noting the lower portion of FIG. i or 4, a flange 10*c* is provided on the circumference of the cylindrical portion 10*a*. When the fixed bush 10 is fixed from the opposite side of the workpiece fixing face 32*a* into the jig mounting hole 32*b*, as described before, therefore, the fixed bush 10 can't be extracted from the workpiece fixing face 32*a* side. At the lower portion inside the cylindrical portion 10*a*, in FIGS. 1 or 4, 6 grooves 10*b* are provided at intervals of equal degrees (at intervals of 60 degrees), with the axis center of the cylindrical potion 10*a* as their center, and radially, as shown in FIG. 2. The groove 10*b* is formed in a circular shape, as shown in FIGS. I or 4, so that the closer to the lower part of FIG. I or 4, the bigger the distance from the axis center of the cylindrical portion 10*a* becomes in the section.

On each workpiece fixing face 32*a* of the jig tool 33, a workpiece 35 to be machined by means of the machine tool 37 is provided in such a manner that 2 opposed faces are held and fixed with two kinds of jigs, 1 and 25. The jig 1 has a main body 2 which is provided with installation reference planes 1*a* and 1*b* parallel to each other at the bottom portion or the upper portion in the figure, as shown in FIG. 1. Inside the main body 2, an engaging shaft storing hole 2*a* of a cylindrical shape is formed so as to have a axis center in the directions of the arrows A and B parallel to the installation reference planes 1*a* and 1*b* in the figure. At the left upper portion of the main body 2 in the figure, a clamping member installation hole 2*b* is formed so as to penetrate to link the engaging shaft storing hole 2*a* with the outer portion of the main body 2. At the left lower portion in the figure, a main body fixing portion 3 is provided.

The main fixing portion 3 is comprised of a main body connecting portion 5, a fixed pin 6, a fixed ball 7, the fixed bush 10 and the like. The main body connecting portion 5 has an axis center parallel to the directions of the arrows C and D perpendicular to the installation reference planes 1*a* and 1*b*. Its outer diameter is smaller than the inside diameter of the cylindrical portion 10*a* of the fixed bush 10. The main body connecting portion 5 is formed in a cylindrical shape and has a thickness T, and is further provided with an internal fixed pin sliding portion 5*a* of cylindrical shape. The fixed pin sliding portion 5*a* connects with the engaging shaft storing hole 2*a*. At the lower portion of the main body connecting portion 5, three ball installation holes 5*b* are formed at equal degree intervals (at intervals of 120 degrees) radially to an axis center CT1 of the fixed pin sliding portion 5*a*, the holes penetrating the main body connecting portion 5, as shown in FIG. 2. Inside each ball installation hole 5*b* is provided one of the fixed balls 7, each of a diameter B ($B>T$). The diameter of the ball installation hole 5*b* is formed so as not to cause the fixed ball 7 inside the fixed pin sliding portion 5*a* to fall out of the ball installation hole 6*b*, and so as to slightly jut the fixed ball 7 into the fixed pin sliding portion 5 at the fixed pin sliding portion 5*a* side, and further, so as to attach and detach the fixed ball 7 at the outer side of the main body connecting portion 5. On a circumferential face 5*c* of the main body connecting portion 5 at the upper portion of the ball installation hole 5*b* in FIG. 1, an O-ring installation groove 5d is provided with an O-ring 9. The O-ring 9 abuts the upper face of the fixed balls 7 in the figure. The fixed balls 7 are always pushed in the direction of the ball installation hole 5b due to the elasticity of the O-ring 9, so that the fixed balls 7 don't go through the ball installation hole 5b. Then, the fixed balls 7 are held jutting partly out of the circumference face 5c of the main body connecting portion 5. In the fixed pin sliding portion 5a, the fixed pin 65 is slidably provided in the directions of the arrows C and D in the figure. The fixed pin 6 is formed in an almost cylindrical shape and so as to have an axis center in the directions of the arrows C and D and an outer diameter slightly smaller than the inside diameter of the fixed pin sliding portion 5a. The lower end 6a, at the lower portion of FIG. 1, is formed in a semi-spherical shape and abuts on the fixed ball 7. At the upper portion of the fixed pin 6 of FIG. 1, a press face 6b is provided. The press face 6b is formed inclining at Θ deg to a face perpendicular to the axis center of the fixed pin 6. The press face 6b juts into the engaging shaft storing hole 2a.

Figure 3:
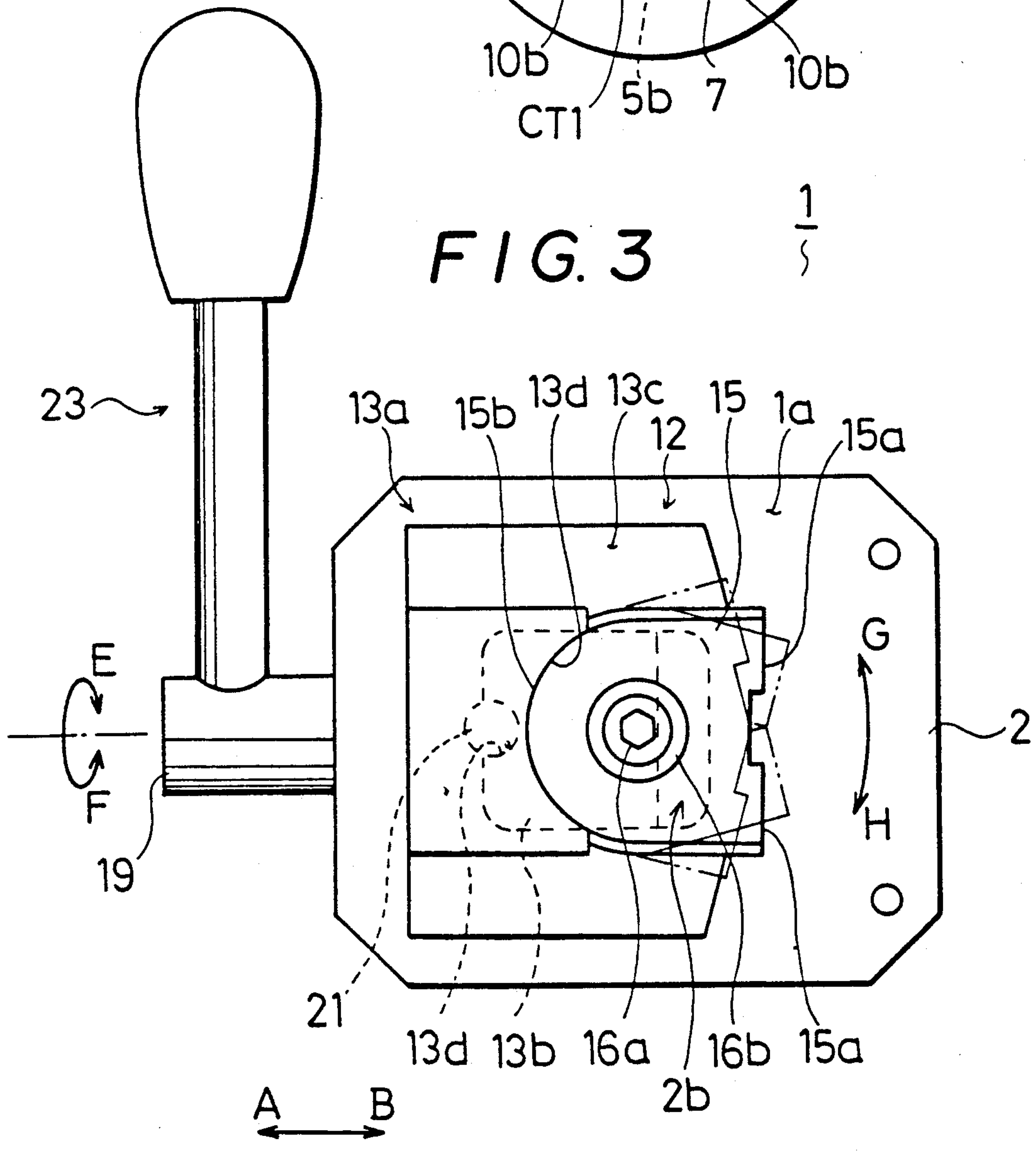
FIG. 3 is a top view of FIG. 1.

At the installation reference plane 1a of the upper portion of FIG. 1 of the main body 2, a workpiece clamping portion 12 is provided. The workpiece clamping portion 12 is comprised of clamping member 13, a claw 15 and the like. The clamping member 13 is comprised of a claw supporting portion 13a at the upper portion of FIG. 1 and an engaging portion 13b at the lower portion. The engaging potion 13b enters the engaging shaft storing hole 2a inside the main body 2 through the clamping member installation hole 2b. A section, parallel to the installation reference plane 1a, of the engaging portion 13b is formed smaller than the clamping member installation hole 2b. Therefore, the clamping member 13 is slidable in the directions of the arrows A and B along the installation reference plane 1a. At the left side, in FIG 1, of the engaging portion 13b, a ball supporting portion 13e is provided, the ball supporting portion 13e being rotatably provided with a ball 21. At the lower side of the ball supporting portion 13e in the figure, an engaging shaft penetrating hole 13h, whose section is round in shape, is provided, penetrating the engaging portion 13b in the directions of the arrows A and B. At the right upper portion, in FIG. 1, of the claw supporting portion 13a, a claw supporting face 13c is formed, being parallel to the installation reference face 1a. On the left side of the claw supporting face 13c, a press face 13d is formed into a circular cone shape, as shown in FIG. 3, so as to have a predetermined angle α to a plane perpendicular to the claw supporting face 13c. The claw supporting face 13c is provided with a claw 15, and the claw 15 is provided with a bolthole 15c. In the bolthole 15c, a bolt 16a and a bush 16b are provided. The bolt 16a is fixed on the claw supporting face 13c. Therefore, the claw 15 can move with its axis center being the bolt 16a in the area of a predetermined angle in the directions of the arrows G and H in a plane parallel to the claw supporting face 13c, as shown in FIG. 3. The outer diameter of the bush 16b is formed smaller than the inside diameter of the bolthole 15c. The claw 15 can move the distance equivalent to the clearance between the bush 16b and the bolthole 15c in the direction parallel to the claw supporting face 13c. Between the claw 15 and the claw supporting face 13c, a coiled spring 16c is disposed, and the coiled spring 16c always energizes the claw 15 in the direction of the arrow C. The claw 15 is then supported with a clearance GP1 away from the claw supporting face 13c due to the elasticity of the coiled spring 16c. On the left side of the claw 15, a press face 15b is provided. The press face 15b is formed into a circular cone shape so as to have a predetermined angle to the plane perpendicular to the claw supporting face 13c. The press face 15b abuts on the press face 13d of the workpiece clamping member 13. When the claw 15 moves with the axis center of the bolt 16a as its center on the claw supporting face 13c as described before, the press face 15b is contacted with the press face 13d. On the right side of the claw 15 is formed a workpiece holding face 15a perpendicular to the claw supporting face 13c.

In the engaging shaft storing hole 2a of the main body 2, an engaging shaft 19 is provided, being slidable in the directions of the arrows A and B, and being rotatable in the directions of the arrows E and F as shown in FIG. 1. The left portion of the engaging shaft 19 juts out of the main body 2. On the portion of the engaging shaft 19 jutting out of the main body 2, a handle 23 is fixed. The engaging shaft 19 is a cylinder in shape, having an axis center in the directions of the arrows A and B, and penetrates the engaging shaft penetrating hole 13h of the clamping member 13 in the directions of the arrows A and B. The outer diameter of the portion penetrating the engaging shaft penetrating hole 13h of the engaging shaft 19 is smaller than the inside diameter of the engaging shaft penetrating hole 13h. Therefore, the clamping member 13 isn't removed from the main body 2. The engaging shaft 19 is provided with a cylindrical cam 19b on the left side of FIG. 1 for the engaging portion 13b of the clamping member 13. On the right of the cylindrical cam 19b, an engaging face 19c is formed. The engaging face 19c abuts the ball 21 with which the engaging portion 13b of the clamping member 13 is rollably provided, and engages with the engaging portion 13b of the clamping member 13 through the ball 21. The engaging face 19c is formed so as to move a distance L1 in the directions of the arrows A and B when the cylindrical cam 19b rotates 180 degrees in the directions of the arrows E and F. On the right side of the engaging shaft 19, and at the position of the upper end of the fixed pin 6 of the main fixing portion 3, a screw portion 19a is formed, with the screw portion 19a fitted into a fixed nut 20. The fixed nut 20 is provided so as to be slidable in the directions of the arrows A and B in the engaging shaft storing portion 2a and so as to restrict rotation in the directions of the arrows E and F. On the lower left side of the fixed nut 20, a press face 20a is provided so as to incline a Θ deg to a plane perpendicular to the directions of the arrows C and D. The press face 20a abuts on the press face 6b of the fixed pin 6. The right end of the engaging shaft storing hole 2a is closed by a cap 2c. In the engaging shaft storing hole 2a, between the fixed nut 20 and the cap 2c, a provisional fixed spring 22 is provided, being pressurized in the directions of the arrows A and B and pushing the fixed nut 20 in the direction of the arrow A. In the engaging shaft storing hole 2a between the fixed nut 20 and the clamping member 13, a clamping member fixing spring 17 is provided, pressurized in the directions of the arrows A and B and pushing the clamping member 13 in the direction of the arrow A in the figure, so that the clamping member 13 always engages with the cylindrical cam 19b of the engaging shaft 19.

As shown in FIG. 4, a jig 25 to be used in combination with the jig 1 on the workpiece fixing face 32a has a main body 26 in which installation reference planes 25a and 26b are formed at the bottom portion and the upper portion in the figure. Inside the main body 26, an engaging shaft storing hole 26*a* of a cylindrical shape is formed so as to have an axis center in the directions of the arrows A and B parallel to the installation reference planes 25*a* and 25*b*. On the lower left side of the main body 26, a main body fixing portion 27 is provided in the same manner as the jig 1. Since the main body fixing portion 27 is the same as the main body fixing portion 3 of the jig 1, except for the press face form of the fixed pin 6, the same elements are marked with the same numerals, and the explanation of these elements will be omitted. The press face 6*c* of the fixed pin 6 with which the main body fixing portion 27 is provided is formed perpendicular to an axis center of the fixed pin 6, and doesn't have an inclination 8, as the press face 6*b* of the jig 1. On the installation reference plane 25*a*, at the upper portion of the main body 26, a workpiece clamping portion 29 is fixed. The workpiece clamping portion is comprised of a clamping member 30, the claw 15 and the like. On the right of the clamping member 30, a claw supporting face 30*c* is formed so as to be parallel to the installation reference face 25*a*. On the left side of the claw supporting face 30*c*, a press face 30*d* in a circular cone shape is formed so as to have a predetermined angle α to the plane perpendicular to the claw supporting face 30*c*. The claw supporting face 30*c* is provided with the claw 15 movable about the axis center of the bolt 16*a*, the bush 16*b* and the spring 16*c* in the area of a predetermined angle on a plane parallel to the installation reference plane 25*a* and in such a manner that the clearance GP1 is formed from the claw supporting face 30*c* in a similar way to the workpiece clamping portion 12 of the jig 1, as shown in FIG. 3. The claw 15 is almost the same as the claw 15 of the jig 1, so the explanation thereof will be omitted. The press face 15*b* with which the claw 15 is provided abuts on the press face 30*d* of the workpiece clamping member 30. As described before, when the claw 15 moves with the axis center of the bolt 16*a* as its center on the claw supporting face 30*c*, the press face 15*b* is contacted with the press face 30*d*. In the engaging shaft storing hole 26*a* of the main body 26, an engaging shaft 31 is provided so as to be rotatable in the directions of the arrows E and F and so as to jut its left end portion out of the main body 2, as shown in FIG. 4. At the portion jutting out of the main body 26 of the engaging shaft 31, the handle 23 is fixed. The engaging shaft 31 is a cylinder in shape, or on the upper end of the fixed pin 6 of the main body fixing portion 27, a plate cam 31*a* is provided. The plate cam 31*a* is provided with a cam circumferential face 31*b* parallel to the directions of the arrows A and B. The cam circumferential face 31*b* abuts on the press face 6*c* of the fixed pin 6.

The arrangement of the jig 1, the jig 25, the jig tool 33 and the like was described above. Next, a method of fixing a workpiece 35 on the base plate 32 of the jig tool 33 by using the jigs 1 and 25 will be discussed. First, the jig mounting holes 32*b* are selected in consideration of the size of the workpiece 35 so as to allocate the jigs 1 and jigs 25 by facing the jigs 1 to the jigs 25, as shown in FIG. 6. The main body fixing portion 3 of the jig 1 and the main body fixing portion 27 of the jig 25 are inserted into respective cylindrical portions 10*a* of the fixed bushes 10 on the workpiece fixing face 32*a* side, as shown in FIG. 1 or 4. When the main body fixing portion 27 of the jig 25 is inserted into the cylindrical portion 10*a* of the fixed bush 10, the plate cam 31*a* of the engaging shaft 31 is properly rotated in the directions of the arrows E and F by means of the handle 23 as shown in FIG. 4. The engagement between the cam circumferential face 31*b* and the press face 6*c* of the fixed pin 6 is then released and a clearance is provided between the cam circumferential face 31*b* and the press face 6*c*. Then the fixed pin 6 becomes movable in the direction of the arrow C, and the fixed ball 7 is pushed and moved so as to jut into the fixed pin sliding portion 5*a*, due to elasticity of the O-ring 9. Then the fixed ball 7 pushes the fixed pin 6 in the direction of the arrow C and is completely encased inside the circumferential face 5*c* of the main body connecting portion 5. In the foregoing state, the main body connecting portion 5 is inserted into the cylindrical portion 10*a* of the fixed bush 10 from the workpiece fixing face 32*a* side so as to contact the installation reference plane 25*b* with the workpiece fixing face 32*a*. Next, the jig 25 is properly rotated with the axis center CT1 of the main body connecting portion 5 as its center, in consideration of the form of the workpiece 35, so that some position among the six grooves 10*b* of the fixed bush 10 corresponds with the position of the ball installation hole 5*b* of the main body connecting portion 5. The engaging shaft 31 is then properly rotated together with the plate cam 31*a* in the directions of the arrows E and F by means of the handle 23, and the cam circumferential face 31*b* is abutted on the press face 6*c* of the fixed pin 6 so that the fixed pin 6 is pushed and moved in the direction of the arrow D. Then the fixed ball 7 jutting into the fixed pin sliding portion 5*a* is pushed out of the fixed pin sliding portion 5*a* by the end 6*a* of the fixed pin 6, and a part of the fixed ball 7 juts into the groove 10*b* of the fixed bush 10, out of the circumferential face 5*c* of the main body connecting portion 5, so as to be in the state of FIG. 6. The groove 10*b* is round in shape so that the lower in FIG. 4, the bigger the distance from the axis center of the cylindrical portion 10*a* becomes in section of the cylindrical portion 10*a*. When the fixed ball 7 juts into the groove 10*b*, therefore, the fixed ball 7 is moved along the groove 10*b* in the downward direction in FIG. 4, so that the ball installation hole 5*b* and the groove 10*b* are respectively pushed down and up in FIG. 4 by the fixed ball 7. The fixed bush 10 is provided with the flange 10*c*. The fixed bush 10 is fixed on the base plate 32 so as not to move upwardly in FIG. 4, so that tensile stress acts between the ball installation hole 5*b* and the installation reference face 25*b* on the main body connecting portion 5 of the jig 25. Then the jig 25 is fixed on the workpiece fixing face 32*a* of the base plate 32 by the tensile stress in such a manner that the installation reference face 25*b* adheres to the workpiece fixing face 32*a*. Since the center axis of the main body connecting portion 5 corresponds with the center axis of the cylindrical portion corresponds with the center axis of the cylindrical portion 10*a* due to the centripetal force of the fixed ball 7 when the fixed ball 7 juts into the groove 10*b*, it is unnecessary that the outer diameter of the main body connecting portion 5 corresponds with the inside diameter of the cylindrical portion 10*a*. That is, any outer diameter of the main body connecting portion 5 can be used if it is smaller then the inside diameter of the cylindrical portion 10*a*.

When the main body fixing portion 3 of the jig 1 is inserted into the cylindrical portion 10*a* of the fixed bush 10, first the engaging shaft 19 is pushed in the direction of the arrow B in FIG. 1 so as to move the fixed nut 20 on the engaging shaft 19 in the direction of the arrow B against the elasticity of the provisional fixed spring 22. Then the engagement between the press face 20a of the fixed nut 20 and the press face 6b of the fixed in 6 is released, and a clearance is provided between the press face 20a and the press face 6b, so that the fixed pin 65 can move in the direction of the arrow C. Then the fixed ball 7 moves into the fixed pin sliding portion 5a, pushing the fixed pin 6 in the direction of the arrow C due to the elasticity of the O-ring 9, similar to the case of the jig 25, as described before, and completely enters inside the circumferential face 5c of the main body connecting portion 5. Next the main body connecting portion 5 is inserted into the cylindrical portion 10a of the fixed bush 10 from the workpiece fixing face 32a side, so as to contact the installation reference plane 1b with the workpiece fixing face 32a. The jig 1 is properly rotated, with the axis center CT1 of the main body connecting portion 5 as its center, in consideration of the form of the workpiece 35, so that some position among the six grooves 10b of the fixed bush 10 can correspond with the position of the ball installation hole 5b of the main body connecting portion 5. When the pushing of the engaging shaft 19 in the direction of the arrow B is released, the fixed nut 20 is pushed and moved together with the engaging shaft 19 in the direction of the arrow A by the provisional fixed spring 22. Then, the press face 20a of the fixed nut 20 abuts on the press face 6b of the fixed pin 6. The fixed pin 6 is pushed and moved in the direction of the arrow D because of having the inclination angle Θ on the press face 6b. Then, the fixed ball 7 jutting into the fixed pin sliding portion 5a is pushed out of the fixed pin sliding portion 5a by the end 6a of the fixed pin 6 and juts into the groove 10b of the fixed bush 10, out of the circumferential face 5c of the main body connecting portion 5, so as to be in the state of FIG. 1. The jig 1 is fixed on the workpiece fixing face 32a of the base plate 32 in such a manner that the installation reference plane 1b adheres to the workpiece fixing face 32a due to the tensile stress acting on the main body connecting portion 5, similar to the jig 25 as described before. Since the above-mentioned tensile stress acts by the spring force of the provisional fixed spring 22, it is small in comparison with the above-mentioned jig 25. Therefore, the jig 1 is fixed provisionally.

In this way, the jigs 1 and 25 are fixed as shown in FIG. 6. Next, the workpiece 35 as shown in FIGS. 1, 4 or 6 with the imaginary line is positioned so as to contact the workpiece holding face 15a of the claw 15 of each jig 25 with the side face 35a of the workpiece 35 along the installation reference faces 1a and 25a of the jigs and 25. As shown in FIG. 1, a clearance L2 is provided between the workpiece holding face 15a of each jig 1 and the side face 35a of the workpiece 35. Then, the engaging shaft 19 of each jig 1 is rotated in the direction of the arrow F in FIG. 1 by means of the handle 23. The engaging shaft 19 fits in the fixed nut 20, but since the fixed nut 20 is held so as not to move in the directions of the arrows A and B by the provisional fixed spring 22 and the fixed pin 6 without putting force to some degree, the engaging shaft 19 moves the distance corresponding to the pitch of the screw portion 19a in the direction of the arrow B. The portion of the engaging face 19c abutting the ball 21 with which the clamping member 13 is provided moves a distance equivalent to the rotation angle of the handle 23 in the direction of the arrow B by the rotation of the cylindrical cam 19b in the direction of the arrow F. Then, the clamping member 13 moves a distance corresponding to the rotation angle of the handle 23, that is, a distance the sum of the whole moving distance of the engaging shaft 19 and the moving distance of the engaging face 19c of the cylindrical cam 19b in the direction of the arrow B, through the movement of the engaging face 19c, the ball 21 and the ball supporting portion 13e, due to the movement of the engaging shaft 19 and the engaging face 19c in the direction of the arrow B. In the rotation of the handle 23 in the direction of the arrow f, the clamping member 13 moves the clearance L2 between the workpiece holding face 15a of the claw 15 with which the clamping member 13 is provided and the side face 35a of the workpiece 35 in the direction of the arrow B so as to contact the workpiece holding face 15a with the side face 35a of the workpiece 35.

When the handle 23 is rotated in the direction of the arrow F, the claw 15 pushes the workpiece 35 in the direction of the arrow B since the workpiece holding face 15a abuts on the side face 35a of the workpiece 35, as described before. Then the reaction force from the workpiece 35 acts on the claw 15 in the direction of the arrow A. The clamping member 13 is pushed in the direction of the arrow A by the claw 15 through the press faces 15b and 13d The engaging shaft 19 is pushed in the direction of the arrow A by the clamping member 13 through the ball supporting portion 13e, the ball 21 and the engaging face 19c of the cylindrical cam 19b. Therefore, the same force as the reaction force acting on the claw 15, received from the workpiece 35, acts on the fixed nut 20 fitting on the screw portion 19a of the engaging shaft 19 in the direction of the arrow A. The fixed nut 20 is pushed and moved in the direction of the arrow A and the fixed pin 6 is pushed and moved in the direction of the arrow D through the press faces 20a and 6b. The fixed ball 7 is pushed out of the fixed pin sliding portion 5a by the end 6a of the fixed pin 6 so as to jut into the groove 10b by the fixed bush 10 further out of the circumferential face 5c of the main body connecting portion 5 in comparison with the above-mentioned provisional fixing state. The fixed ball 7 moves downward along the groove 10b in FIG. 1 and the ball installation hole 5b and the groove 10b are pushed in the downward and upward directions, respectively in FIG. 1, by the fixed ball 7. The fixed bush 10 is provided with the flange 10c and the fixed bush 10 is fixed on the base plate 32 so as not to move upwardly. Therefore, tensile stress acts on the main body connecting portion 5 of the jig 1 between the ball installation hole 5b and the installation reference plane 1b, and the jig 1 is fixed on the workpiece fixing face 32a of the base plate 32 due to the tensile stress in such a manner that the installation reference plane 1b adheres to the workpiece fixing face 32a. The tensile stress is quite large in comparison with the stress of the force of the provisional fixed spring 22 during the above-mentioned provisional fixing. Accordingly, the jig 1 is securely fixed on the workpiece fixing face 32a.

The clamping member 13 is pushed and moved the distance corresponding to the rotation angle of the handle 23 in the direction of the arrow B through the engaging face 19c, the ball 21 and the ball supporting portion 13e through the rotation of the cylindrical cam 19b in the direction of the arrow F at the same time as the fixing of the jig 1 on the workpiece fixing face 32a, as described before. The claw 15 with which the clamping member 13 is provided abuts the side face 35a of the workpiece 35 with the workpiece holding face 15a, and the claw 15 receives the reaction force from the workpiece 35 in the direction of the arrow A. The claw 15 is held by the bolt 16a through the bush 16b, having its outer diameter smaller than the inside diameter of the bolthole 15c and the spring 16c capable of shrinking and stretching in the directions of the arrows C and D on the claw supporting face 13c so as to move in the directions parallel to and perpendicular to the claw supporting face 13c. Therefore, the claw 15 is pushed and moved along the press face 13d in the direction of the arrow D due to the pushing force of the press face 13d of the clamping member 13, having an inclination $\alpha$. Then the claw 15 pushes the workpiece 35 in the directions of the arrows B and D by the workpiece holding face 15a, and the workpiece 35 is fixed.

When the claw 15 of the jig 1 pushes the workpiece 35 in the direction of the arrow B in FIG. 1, the claw 15 of the jig 25 facing the jig 1, which is fixed on the workpiece fixing face 32a, is pushed and moved in the direction of the arrow A in FIG. 4 by the workpiece 35. The clamping member 30 of the jig 25 is fixed on the main body 26, as shown in FIG. 4. The claw 15 is held by the bolt 16a through the bush 16b, having an outer diameter smaller than the inside diameter of the bolthole 15c, and the spring 16c being capable of shrinking and stretching in the directions of the arrows C and D on the claw supporting face 30c, so as to move the claw 15 in the directions parallel to and perpendicular to the claw supporting face 30c. Accordingly, the claw 15 is pushed and moved along the press face 30d in the direction of the arrow D, due to the pushing force of the press face 30d, having an inclination $\alpha$ of the clamping member 30. Then the claw 15 pushes the workpiece 35 in the directions of the arrows B and D with the workpiece holding face 15a, and the workpiece 35 is fixed. Since the workpiece 35 is fixed by being pushed on the installation reference planes 1a and 25a of each jig by means of the jigs 1 and 25, relief and chatter of the workpiece 35 can be prevented in case of machining.

Tensile stress acts between the cylindrical cam 19b and the screw portion 19a of the engaging shaft 19 in use of the workpiece clamping portion 12 and the main body fixing portion 3 of the jig 1, so as to proportionate the tensile stress to the reaction force acting on the claw 15, which is received from the workpiece 35 in the direction of the arrow A in FIG. 1 through the cylindrical cam 19b, the ball 21 and the clamping member 13, and the reaction forces acting on the fixed nut 20, which is received from the fixed pin 6 in the direction of the arrow B in FIG. 1.

In this way, when the installation of predetermined workpieces on all the workpiece fixing faces 32a of the jig tool 33 finishes, a predetermined tool is installed on the spindle 39 of the machine tool 37. The table 36 is then properly rotated in the directions of the arrows I and J as shown in FIG. 7 so as to face the workpiece 35 to be machined to the tool installed on the spindle 39. The base 37b, the column 37c and the spindle stock 37d are properly moved in the directions of the arrows K and L, M and N, and P and Q, respectively. Then the machining of the workpiece 35 is performed. When the machining of one workpiece 35 finishes, the table 36 is properly rotated in the directions of the arrows I and J, the pre-machined workpiece installed on the jig tool 33 faces toward the tool installed on the spindle stock 39, and machining is performed as described before. In this way, the machining of the workpiece installed on each workpiece fixing face 32a is performed.

When machining is performed on all the workpieces installed on the jig tool 33 as described before, and the machining finishes, the machined workpieces are detached from the jig tool 33. When the workpiece 35 is detached from the jig tool 33, the handles 23 of the jigs 1, among the four jigs 1 and 25 fixing the workpiece 35, are rotated in the direction of the arrow E in FIG. 1 to position the handle 23 of the engaging shaft 19 as shown in FIG. 3. Then the engaging shaft 19 and the cylindrical cam 19b rotate in the direction of the arrow E, and the engaging face 19c, pushing the workpiece clamping portion 12 in the direction of the arrow B, moves in the direction of the arrow A. The workpiece clamping portion 12 is pushed and moved in the direction of the arrow A due to elasticity of the clamping member fixing spring 17. The contact between the claw 15 of the workpiece clamping portion 12 and the workpiece 35 is then released, and a clearance is provided between the workpiece holding face 15a of the claw 15 and the side face 35a of the workpiece 35. At the same time, the pushing force of the jigs 25 on the workpiece 35 disappears. The workpiece 35 can then be detached. The workpiece 35 is detached from the jig tool 33, and the other workpieces installed on the jig tool 33 are also detached in a similar way.

Since the tensile stress acting between the cylindrical cam 19b and the screw portion 19a of the engaging shaft 19 of the jig 1 disappears, the pushing force of the fixed nut 20 toward the fixed pin 6 is weakened. However, since the fixed nut 20 is pushed by the provisional fixed spring 22, the main body fixing portion 3 is in an actuated state, and the jig 1 is still fixed on the base plate 32. Accordingly, if it is necessary to detach the jigs 1 and 25 from the base plate 32 of the jig tool 33, in the detachment of the jig 1, the engaging shaft 19 is pushed in the direction of the arrow B in FIG. 1 against the elasticity of the provisional fixed spring 22 so as to push and move the fixed nut 20 in the direction of the arrow B. Then a clearance is provided between the press face 20a of the fixed nut 20 and the press face 6b of the fixed pin 6 so as to move the fixed pin 6 in the direction of the arrow C. The fixed ball 7 is pushed and moved into the fixed pin sliding portion 5a, pushing and moving the fixed pin 6 in the direction of the arrow C, due to the elasticity of the O-ring 9, in a similar way to the above mentioned case of installing the jig on the base plate 32. Then the fixed ball 7 moves completely inside the circumferential face 5c of the main body connecting portion 5. When the whole jig 1 is pulled in the direction of the arrow C in FIG. 1, therefore, the main body connecting portion 5 is pulled out of the cylindrical portion 10a of the fixed bush 10, and the jig 1 can be detached from the base plate 32. When the jig 25 is detached, the handle 23 is properly rotated in the directions of the arrows E and F in FIG. 4 so as to rotate the engaging shaft 31 and the plate cam 31a in the directions of the arrows E and F. Then a clearance is provided between the cam circumferential face 31b of the plate cam 31a and the press face 6c of the fixed pin 6 so as to be able to move the fixed pin 6 in the direction of the arrow C. Then the main body connecting portion 5 is pulled out of the cylindrical portion 10a of the fixed bush 10 to detach the jig 25 from the base plate 32, similarly to jig 1.

In the above-mentioned embodiment, the fixed bush 10 is provided with the grooves 10b at 60° intervals. Since the object is to index the jig, any number of grooves 10b can be used, if the number is a multiple of the number of the fixed balls 7. Therefore, various forms of workpieces can be held and fixed, in such a manner that the possible area of oscillating the claw 15 in the directions of the arrows G and H, as shown in FIG. 3, is set according to the set angle area of the grooves 10*b* by increasing the number of the grooves 10*b* of the fixed bush 10, as long as there is enough space to provide the grooves. It was mentioned that the section of the groove 10*b* is round in shape, as shown in FIGS 1 and 4. However, any form of the groove 10*b* is usable in which the fixed ball 7 can be pushed and moved downward when the fixed ball 7 juts into the groove 10*b*. Any form is usable as long as the groove 10*b* is formed in such a manner that the closer to the lower portion of FIGS. 1 and 4, the bigger the distance from the center of the cylindrical portion 10*a* becomes.

Figure 9:
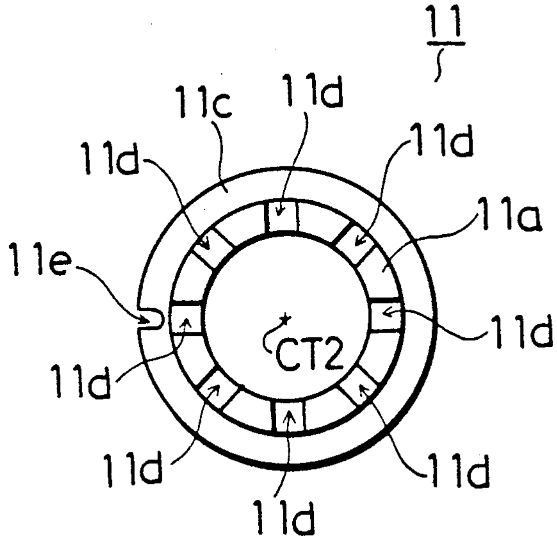
FIG. 9 is a top view showing an example of a fixed bush.
Figure 10:
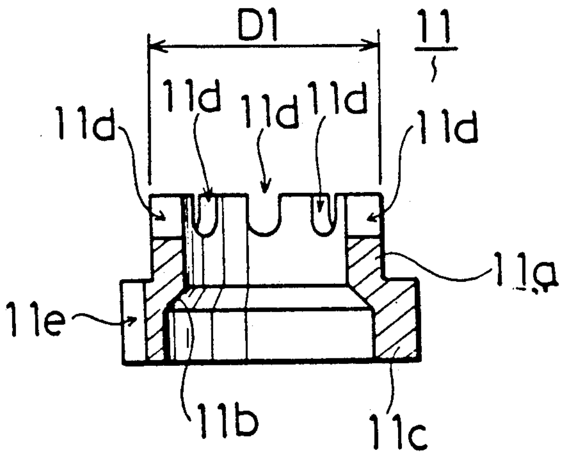
FIG. 10 is a sectional view of the fixed bush as shown in FIG. 9.
Figure 8:
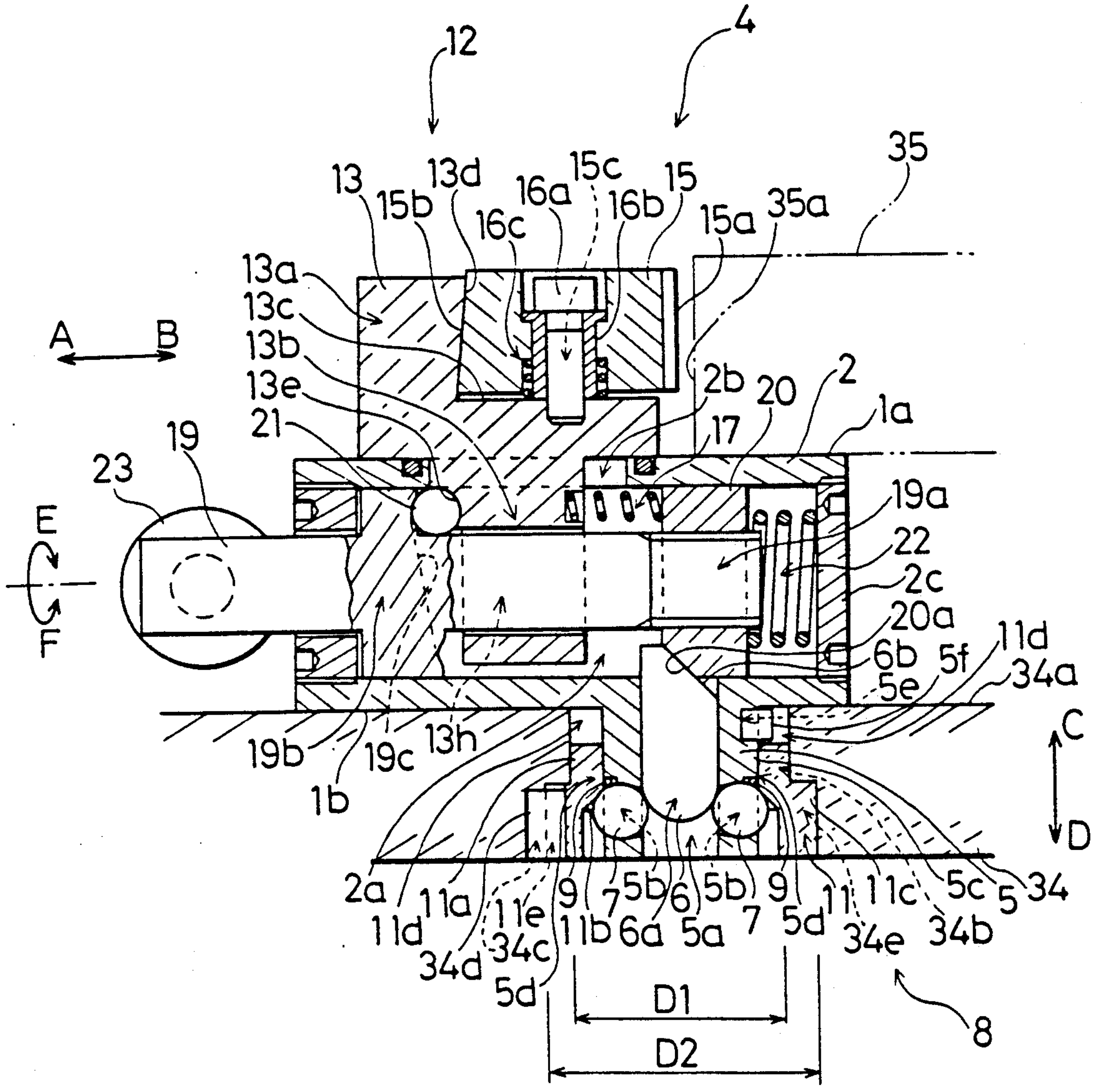
FIG. 8 is a sectional view showing a second embodiment of a jig according to the present invention.

In the above-mentioned embodiment, the main body connecting portion 5 of the main body fixing portion 3 or 27 is provided with the ball installation holes 5*b* and the fixed balls 7, and the fixed bush 10 of the base plate 32 is provided with the grooves 10*b*, so as to index and fix the jig 1 or 25 on the workpiece fixing face 32*a* of the base plate 32. However, any main body fixing portion or any base plate can be used, as long as indexing and fixing can be performed. Next, a base plate 34 and a jig 4, with which a main body fixing portion 8 is provided, as shown in FIG. 8, will be explained. A workpiece fixing face 34*a* of the base plate 34 is provided with a jig mounting hole 34*b* of a cylindrical shape, having an inside diameter of D1, an axis center perpendicular to the workpiece fixing face 34*a*, and penetrating the base plate 34 in the directions of the arrows C and D in FIG. 8, in the same way as the base plate 32. On the lower side of the jig mounting hole 34*b*, a bush fixing portion 34*e*, having an inside diameter D2 bigger than D1, is formed. On the left side, in FIG. 8, of the bush fixing portion 34*e*, a pin mounting portion 34*c* is formed. A pin 34*d* is driven into the pin mounting portion 34*c* so as to connect a fixed groove 11*e* of a fixed bush 11, as will be described later, with the mounting portion 34*e*. The fixed bush 11 as shown in FIGS. 9 and 10 is inserted and installed in the jig mounting hole 34*b* from the opposite side of the workpiece fixing face 34*a*, that is, from the lower side in FIG. 8. The fixed bush 11 has a cylindrical portion 11*a* whose outer diameter is equivalent to the inside diameter D1 of the jig mounting hole 34*b* of the base plate 34, as shown in FIGS. 9 and 10. On the circumference of the cylindrical portion 11, in the lower part of FIG. 10, a flange 11*c* is provided. At the upper portion of the cylindrical portion 11*a*, eight indexing grooves 11*d* are radially provided, with an axis center CT2 of the cylindrical portion 11*a* as their center, at intervals of equal angles (at 45° intervals), as shown in FIG. 9. At the lower portion of FIG. 10, inside the cylindrical portion 11*a*, a conical surface 11*b* is formed such that the closer to the lower part of FIG. 10 the surface is, the bigger the distance from the axis center CT2 of the cylindrical portion 11*a* becomes. On the left of the flange 11*c*, the fixed groove 11*e* is provided. The fixed groove 11*e* is engaged with the pin 34*d*, as shown in FIG. 8. It is thus possible to prevent the fixed bush 11 from rotating, with the axis center CT2 as its center, in the jig mounting hole 34*b*, by means of the pin 34*d*. The jig 4 to be fixed on the workpiece fixing face 34*a* of the base plate 34 is provided with the main body fixing portion 8 at its lower portion in FIG. 8. However, the jig 4 is similar to the jig 1, except for the main body fixing portion 8. Therefore, the same elements are marked with the same numerals, and the explanation of these elements will be omitted. The main body fixing portion 8 is provided with the main body connecting portion 5 in the same way as the jig 1. The main body connecting portion 5 is provided with a pin mounting portion 4*e* on the circumferential face 5*c* of the main body connecting portion 5. The mounting portion 5*e* is provided with a pin 5*f*. With the above-mentioned arrangement of the base plate 34 and the jig 4, when fixing the jig 4 on the workpiece fixing face 34*a*, the main body connecting portion 4 is inserted into the cylindrical portion 11*a* of the fixed bush 11 so as to engage the pin 5*f* with some indexing groove 11*d* suitable for the form of the workpiece to be clamped while pushing the engaging shaft 19 in the direction of the arrow B, similar to jig 1. Next, in a similar way to the jig 1, pushing of the engaging shaft 19 in the direction of the arrow B is stopped, and the fixed balls 7 are moved along the conical surface 11*b* by means of the fixed pin 6 through the provisional fixed spring 22 and the fixed nut 20 outside and downwardly in FIG. 8 so as to fix the jig 4 on the base plate 34. When clamping a workpiece, the same operations as with the jig 1 are performed. When the jig 4 is fixed on the base plate 34, it is fixed by means of the fixed balls 7 and the conical surface 11*b* with respect to the directions of the arrows C and D in FIG. 8, and by means of the pin 5*f* and the indexing groove 11*d* with respect to rotation in the directions of the arrows C and D. Therefore increasing the number of the indexing grooves 11*d* in order to index more closely is more advantageous than increasing the number of the grooves 10*b* of the fixed bush 10, as shown in FIG. 2, in terms of space and simplicity of machining.

Figure 11:
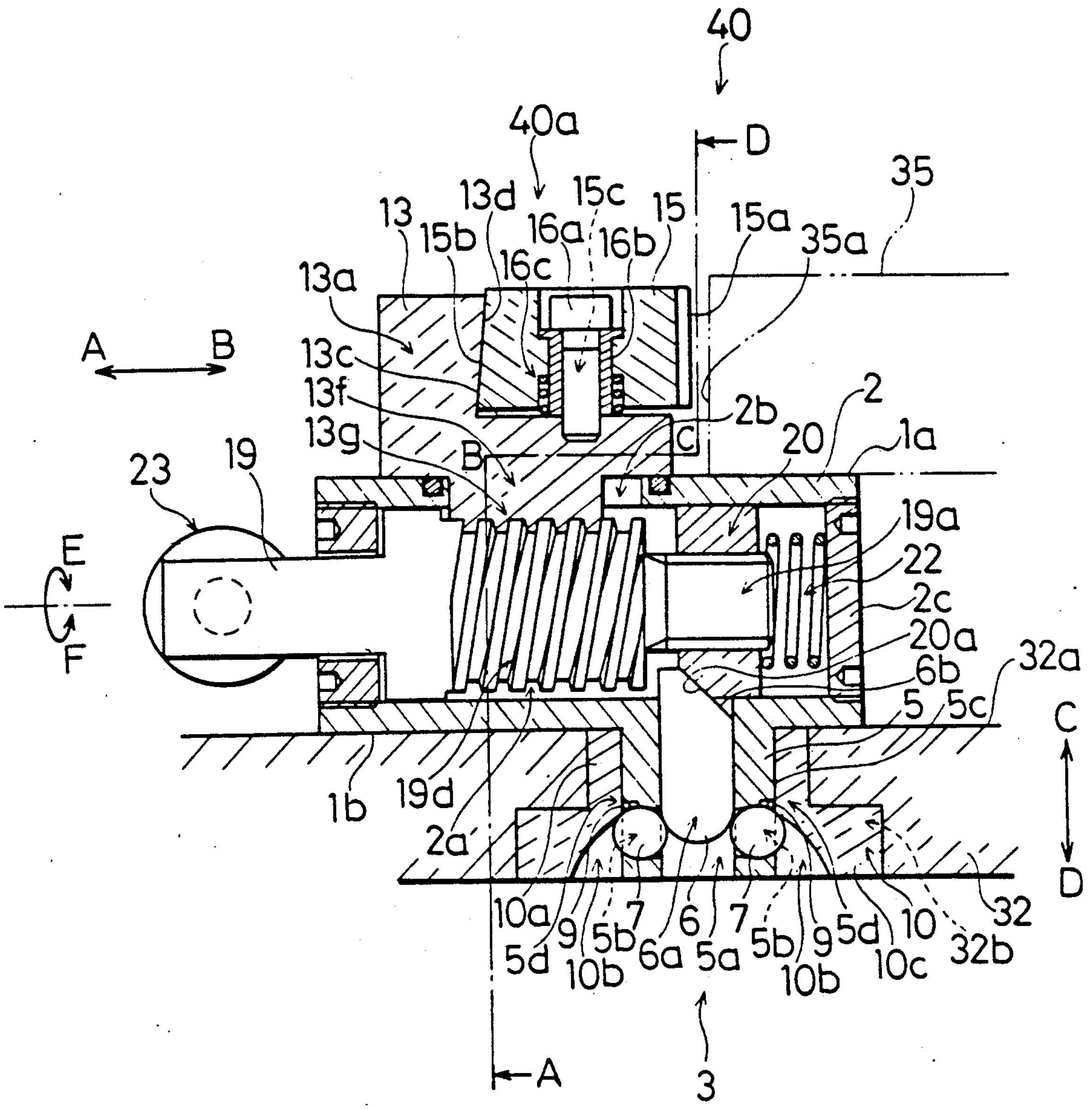
FIG. 11 is a sectional view showing another example of a jig according to the present invention.
Figure 12:
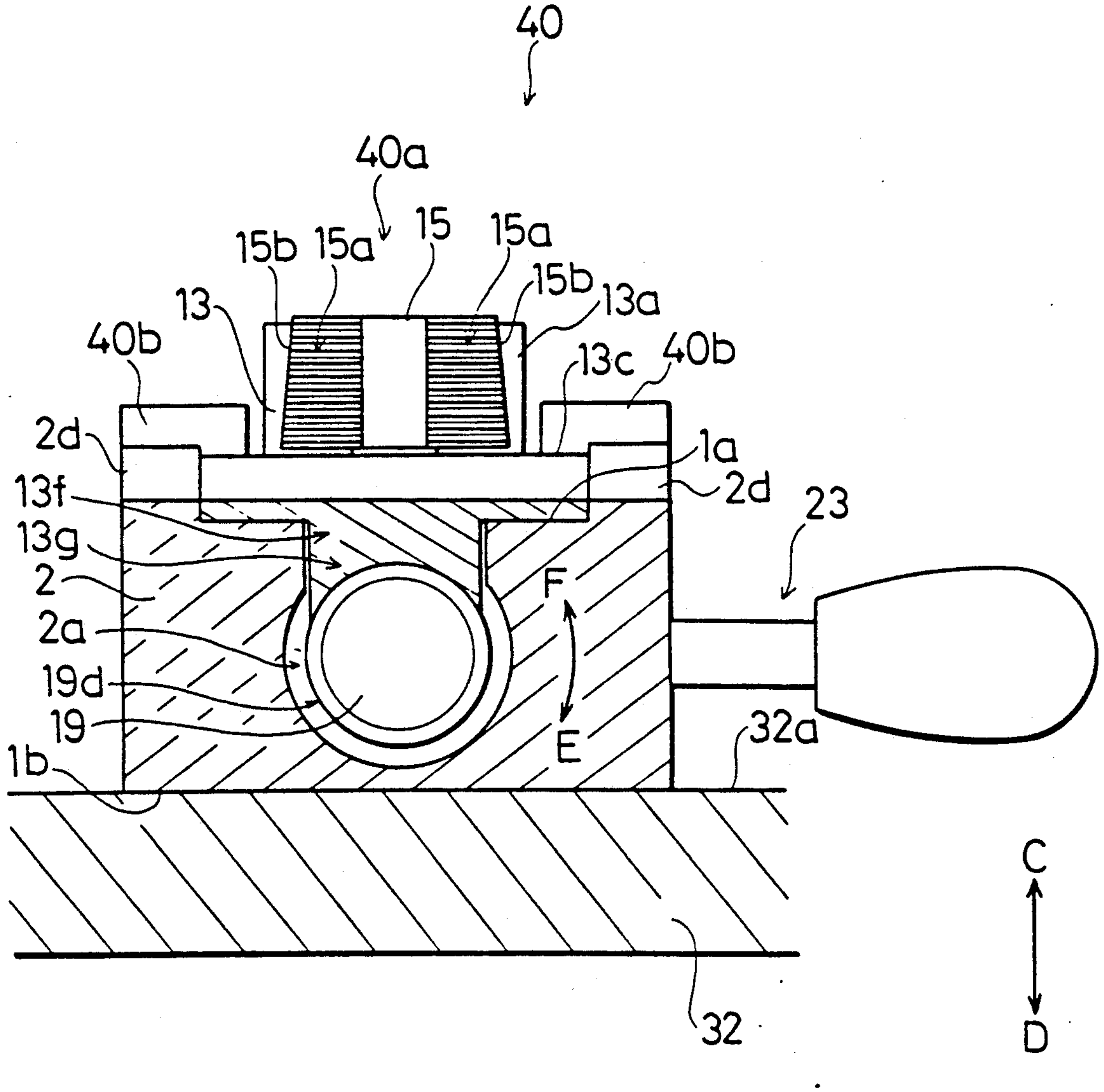
FIG. 12 is a sectional view along the line ABCD of the jig as shown in FIG. 11.

In the above-mentioned embodiment, the screw portion 19*a* is provided as a main body fixing portion acting means and the cylindrical cam 19*b* is provided as a workpiece clamping portion acting means. However, any main body fixing portion acting means or any workpiece clamping portion acting means can be used if the rotation of the engaging shaft 19 can be converted into linear motion so as to act as a main body fixing portion and a workpiece clamping portion. Next, a jig 40, as shown in FIG. 11 or 12, will be explained. Since the jig 40 is similar to the jig 1, except for the workpiece clamping portion acting means and workpiece clamping portion, the same elements are marked with the same numerals, and the explanation of these elements will be omitted. The jig 40 to be fixed on the workpiece fixing face 32*a* of the base plate 32 is coupled with the engaging shaft 19 in the engaging shaft storing hole 2*a* of the main body 2, as shown in FIG. 11. The engaging shaft 19 is provided with the screw portion 19*a* engaging with the fixed nut 20 similar to the jig 1. On the left side of the screw potion 19*a*, a workpiece clamping portion acting screw 19*d* is provided. The workpiece clamping portion acting screw 19*d* is bigger than the screw portion 19*a* in pitch diameter, or pitch. On the upper part of the workpiece clamping portion acting screw 19*d* is provided a workpiece clamping portion 40*a*. The workpiece clamping portion 40*a* comprises the clamping member 13. At the lower portion of the clamping member 13 is provided an engaging portion 13*f*. The engaging portion 13*f* is provided with a screw portion 13*g*. The screw portion 13*g* is engaged with the workpiece clamping portion acting screw 19*d*. The clamping member 13 is provided with the claw 15, similar to the jig 1. The main body 2 is provided with clamping member supporting means 2*d* and 40*b*, as shown in FIG. 12. These prevent the clamping member 13 from escaping from the main body 2. With the above-mentioned arrangement of the jig 40, when the jig 40 is fixed on the workpiece fixing face 32*a*, the same operations as those of the jig 1 are performed. When the workpiece 35 is clamped, the engaging shaft 19 is rotated in the direction of the arrow F in FIG. 11 by means of the handle 23 in a similar way to the jig 1. Then the workpiece clamping portion acting screw 19*d* is rotated in the direction of the arrow F, and the workpiece clamping portion 4*a* moves the distance corresponding to the rotation angle of the engaging shaft 19 in the direction of the arrow B by means of the screw portion 13*g* of the clamping member 13 engaging with the workpiece clamping portion acting screw 19*d*. The workpiece clamping portion acting screw 19*d* is bigger than the screw portion 19*a* in pitch diameter and pitch, so that it is possible to make the above-mentioned moving distance bigger. The workpiece 35 is clamped, being pushed in the directions of the arrows B and D by means of the workpiece holding face 15*a* of the claw 15 with which the workpiece clamping portion 40*a* is provided. When the reaction force from the workpiece 35 is transferred to the engaging shaft 19, the fixed ball 21 mediates between the clamping member 13 and the engaging shaft 19 in the case of the jig 1. However, large compressive stresses act on the fixed ball 21, since the contact area between the fixed ball 21, and the ball supporting portion 13*e*, or the engaging face 19*c*, is small. On the contrary, in the case of the jig 40, the reaction force from the workpiece 35 is transferred to the engaging shaft 19 through the screw portion 13*g* and the workpiece clamping portion acting screw 19*d*, so that the contact area is bigger and the acting stress is small. Therefore, the jig 40 is effective in cases of high load, as compared to the jig 1.

In the above-mentioned embodiments, the arrangement is such that the axis center of the engaging shaft 19 is parallel to the moving direction of the workpiece clamping portion 12 or 40*a* and perpendicular to the moving direction of the fixed pin 6 of the main body fixing portion 3 or 8. However, any arrangement of the engaging shaft 19 is usable if it is possible to engage with both the workpiece clamping portion 12 or 40*a* and the main body fixing portion 3 or 8. For instance, such an arrangement is contemplated wherein the axis center of the engaging shaft 19 is perpendicular to the moving direction of the workpiece clamping portion 12 or 40*a*. In this case, a plate cam or the like can be used instead of the cylindrical cam 19*b*, as shown in FIG. 1.

It is of course possible to install the jigs 1, 4, 40, and 25 on the base plate, workpiece table or the like other than the base plate 32 or 34 of the jig tool 33 in FIG. 5 or 6.

Another embodiment of the present invention will be explained hereinafter.

Figure 13:
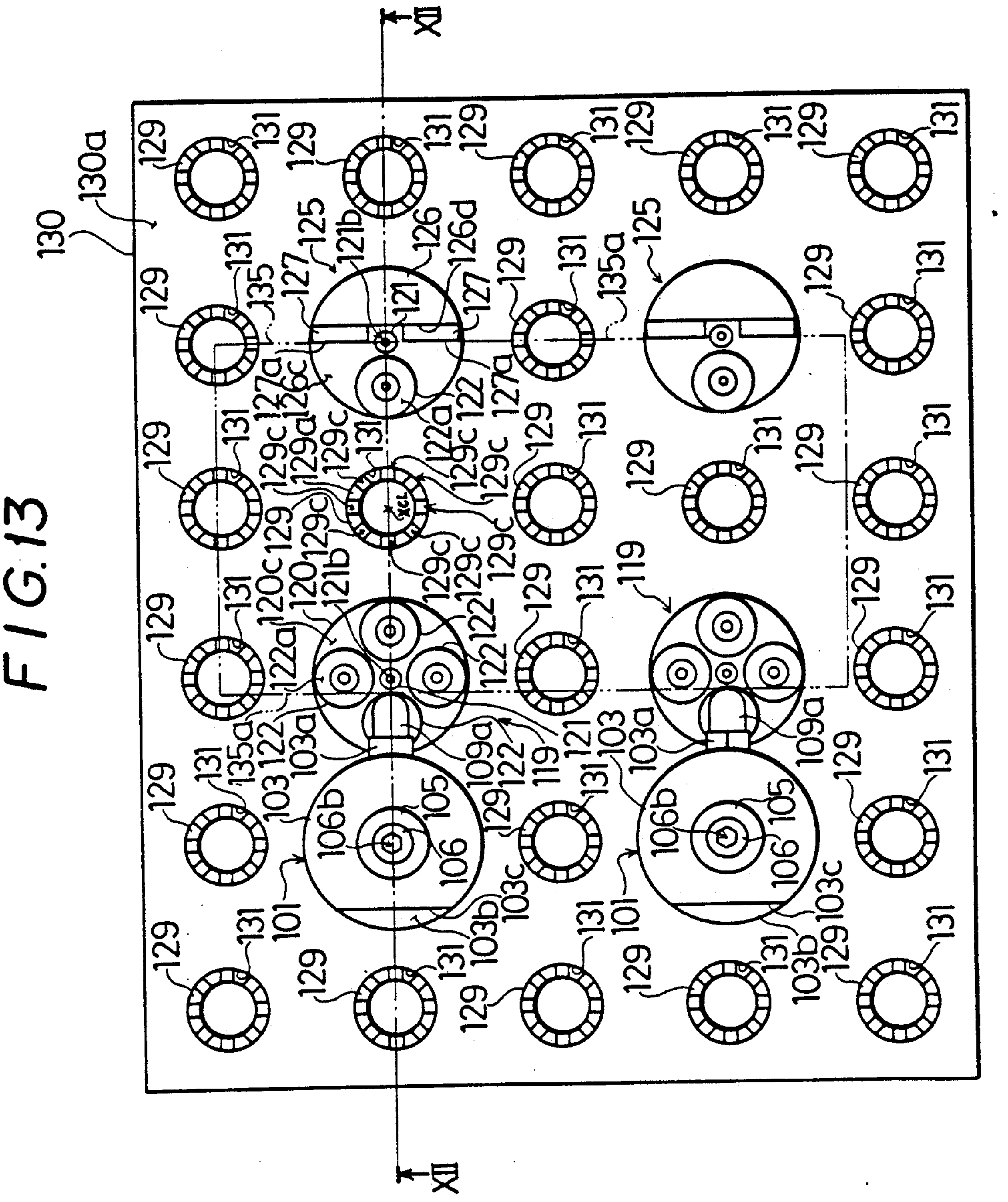
FIG. 13 is a top view showing a third embodiment of a jig according to the present invention, two kinds of jigs to be used in combination with the jig, a base plate and a fixed bush.
Figure 14:
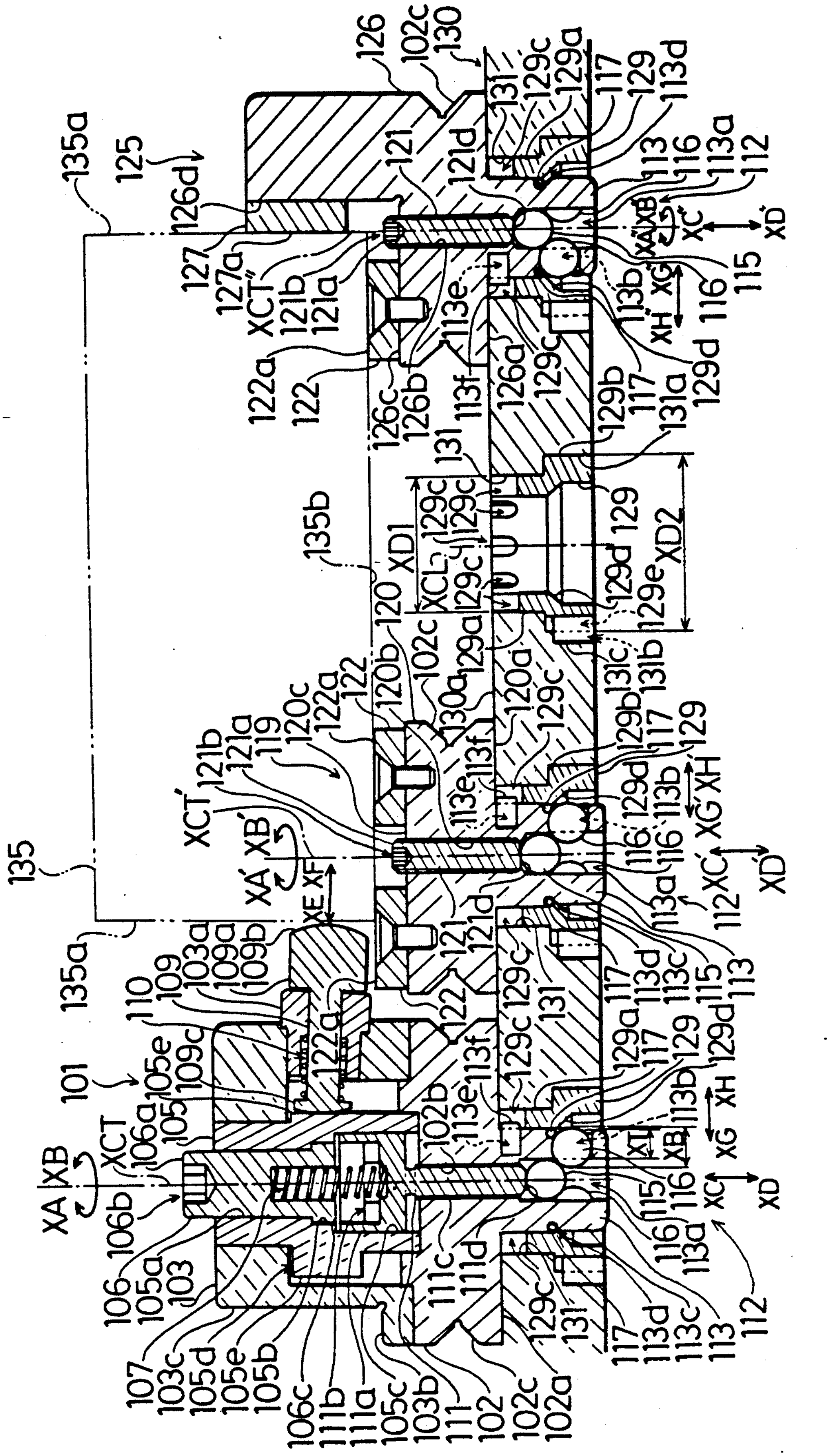
FIG. 14 is a sectional view along the line XII—XII of the jigs, the base plate and the fixed bushes shown in FIG. 13.

A machine tool for which a jig 101 according to the present invention is used, such as a machining center and a milling machine, is provided with a base plate 130 as shown in FIG. 13. The base plate 130 is provided with a workpiece fixing face 130*a* for facing a spindle of the machine tool (not shown). As shown in FIG. 14, the workpiece fixing face 130*a* is provided with a plurality of jig mounting holes 131 of cylindrical shape, having inside diameters of XD1, ranging vertically and horizontally, as shown in FIG. 13, so as to have an axis center XCL perpendicular to the workpiece fixing face 130*a* and so as to penetrate the base plate 130 in the upward and downward directions in FIG. 14. At the opposite side of the workpiece fixing face 130*a* of each jig mounting hole 131, or on the lower side of FIG. 14, a bush fixing portion 131*a* is formed. The inside diameter XD2 of the bush fixing portion 131*a* is bigger than XD1. On the left side of the bush fixing portion 131*a*, a pin mounting groove 131*b* is formed. A pin 131*c* is driven into the pin mounting groove 131*b* so as to connect a fixed groove 129*e* of a fixed bush 139, as will be described later, with the pin mounting groove 131*b*. At the inner portion of the jig mounting hole 131, the fixed bush 129 is inserted and installed from the opposite side of the workpiece fixing face 130*a* i.e. from the lower side portion in FIG. 14, as shown in FIGS. 13 and 14. The fixed bush 129 has a cylindrical portion 129*a* whose outer diameter is equal to the inside diameter XD1 of the jig mounting hole 131. On the circumference of the cylindrical portion 129*a*, on the lower side in FIG. 14, a flange 129*b* is provided. When the fixed bush 129 is inserted into the jig mounting hole 131 form the opposite side of the workpiece fixing face 130*a*, therefore, it is impossible to remove the fixed bush 129 from the workpiece fixing face 130*a* side, as described before. At the upper portion, in FIG. 14, of the cylindrical portion 129*a*, eight indexing grooves 129*c* are radially formed, with the axis center XCL as their center, at intervals of equal angle (at 45° intervals), as shown in FIG. 13. At the lower side of the inner portion of the cylindrical portion 129*a*, a conical surface 129*d* is formed such that the further down in the figure, the larger the distance becomes from the axis center XCL of the cylindrical portion 129*a*. At the left portion of the flange 129*b*, the fixed groove 129*e* is formed. The fixed groove 129*e* is engaged with the pin 131*c* as shown in FIG. 14. Therefore, the pin 131*c* can surely prevent the fixed bush 129 from rotating about the axis center XCL in the jig mounting hole 131.

On the workpiece fixing face 130*a* of the base plate 130, a workpiece 135 to be machined is provided so as to be fixed and held by two kinds of jigs 101 and 125 on its opposed side faces 135*a*, and so as to be supported by the jigs 119 and 125 on a bottom face 135*b*.

The jig 101 has a fixing portion main body 102 having an installation reference plane 102*a* at its bottom portion, as shown in FIG. 14. The fixing portion main body 102 is formed in a disc shape. On its outer peripheral face, a holding groove 102*c* having a V-shaped section is formed. On the upper side of the fixing portion main body 102 is fixed a clamping portion main body 103, having the same outer diameter as the fixing portion main body and formed in a cylindrical shape. The clamping portion main body 103 is provided with a cam shaft 105, rotatable in the directions of the arrows XA and XB, and with an axis center XCT perpendicular to the installation reference plane 102*a*. On the axis center XCT inside the cam shaft 105, a clutch shaft sliding hole 105*a* of a cylindrical shape is formed. On the lower side of the clutch shaft sliding hole 105*a* is provided a clutch shaft engaging hole 105*b*, having the form of a hexagon in section, and perpendicular to the axis center XCT. Moreover, at the lower portion of the clutch shaft engaging hole 105*b*, an operation pin sliding hole 105*c* of a cylindrical shape is provided. On the outside of the cam shaft 105 is provided a plate cam 105*d* having a cam circumferential face 105*e* parallel to the axis center XCT, the cam circumferential face 105*e* moving in the right and left directions in the figure by rotation in the directions of the arrows XA and XB, for an operation portion 109*c* of a clamping pin 109, as will be described later.

The clutch shaft sliding hole 105*a* is provided with a clutch shaft 106 of an almost cylindrical shape so as to be rotatable in the directions of the arrows XA and XB, so as to be slidable in the directions of the arrows XC and XD parallel to the axis center XCT, and so as to jut an operation face 106*a* on its upper end out of the clamping portion main body 103. The operation face 106*a* of the clutch shaft 106 is provided with an operation hole 106*b*, having a hexagonal section, for the insertion of a wrench or the like, having a hexagonal section. At the lower end of the clutch shaft 106, an engaging projection 106*c*, having the form of a hexagon in section and perpendicular to the axis center XCT, is provided so as to be insertable in and removable from the clutch shaft engaging hole 105*b* of the cam shaft 105. The clutch shaft 106 is always biased upward in the figure, in the direction of the arrow XC, by a coiled spring 107, and the engaging projection 106*c* is thereby inserted in and engaged with the clutch shaft engaging hole 105*b*.

On the right side of the plate cam 105*d* of the cam shaft 105, the clamp pin 109 is provided, being held by a clamp pin supporting member 103*a*, which is fixed in the clamping portion main body 103 so as to be movable in the directions of the arrows XE and XF, slightly inclining in the rightward-downward direction in the figure, relative to the installation reference plane 102*a*. The operation portion 109*c* of the clamp pin 109 is provided at the right side of the plate cam 105*d*. The operation portion 109*c* is biased in the direction of the arrow XE by a coiled spring 110 provided between the clamp pin 109 and the clamp pin supporting member 103*a* so as to always but the cam circumferential face 105*e* of the plate cam 105*e*. On the right side of the clamp pin 109, that is, in the direction of the arrow XF, a workpiece clamping member 109*a*, at which a workpiece clamping face 109*b* is formed, is provided so as to jut out of the clamping portion main body 103 in the rightward direction in the figure. The workpiece clamping face 109*b* is an almost spherical surface.

The operation pin sliding hole 105*c* of the cam shaft 105 is provided with a main body fixing unit operation pin 111, rotatable, with the axis XCT as its center, through a clutch shaft engaging portion 111*a* of an almost cylindrical shape in the directions of the arrows XA and XB, and slidable in the directions of the arrows XC and XD. At the portion corresponding to the lower portion of the clutch shaft 106, inside clutch shaft engaging portion 111*a*, a clutch shaft engaging hole 111*b*, having the form of a hexagon in section and perpendicular to the axis center XCT, is provided. The engaging projection 106*c* of the clutch shaft 106 can be fitted in and pulled out of the clutch shaft engaging hole 111*b*. The main body fixing unit operation pin 111 is provided with an operation screw 111*c*, elongated in the directions of the arrows XC and XC on the lower part of the clutch shaft engaging portion 111*a*. The operation screw 111*c* is engaged with an operation pin engaging screw 102*b*, provided on the axis XCT of the fixing portion main body 102. The operation screw 111*c* can then move in the directions of the arrows XD and XC by rotation in the directions of the arrows XA and XB.

On the lower side of the fixing portion main body 102, a main body fixing unit 112 is provided on the reference axis XCT. The main body fixing unit 112 has an insertion cylinder 113. The insertion cylinder 113 is formed so as to have an outer diameter smaller than the inside diameter of the cylindrical portion 129*a* of the fixed bush 129 and to be in a cylindrical shape, having a thickness of XT. The insertion cylinder 113 also has an operation ball sliding hole 113*a* inside it. The operation ball sliding hole 113*a* is linked to the inner portion of the operation pin engaging screw 102*b* of the fixing portion main body 102. An end portion 111*d* of the lower end of the operation screw 111*c* of the main body fixing unit operation pin 111 juts into the operation ball sliding hole 113*a*. On the lower side of the end portion 111*d*, an operation ball 115 of an spherical shape is provided so as to be slidable in the directions of the arrows XC and XD, abutting on the end 111*d*. The operation ball 115 is supported abutting fixed balls 116, as will be described later, so as not to drop out of the operation ball sliding hole 113*a*. At the lower portion of the insertion cylinder 113, three ball installation holes 113*b* are radially provided at intervals of equal angles (at 120° intervals) about the axis center XCT, penetrating the cylinder 113. Inside each ball installation hole 113*b*, the fixed ball 116 of spherical shape, having a diameter of B ($B > T$), is provided so as to be movable in the directions of the arrows XG and XH, in the radial direction to the axis center XCT. At the operation ball sliding hole 113*a* of the ball installation hole 113*b*, the diameter of the ball installation hole 113*b* is formed so as not to allow the fixed ball 116 into the operation ball sliding hole 113*a* from the ball installation hole 113*b*, and so as to abut the fixed ball 116 with the operation ball 115, by jutting the fixed ball 116 a predetermined distance into the operation ball sliding hole 113*a*. At the circumferential face 113*c* of the insertion cylinder 113 of the ball installation hole 113*b*, the diameter is formed so as to enter and pull the fixed ball 116. On the circumferential face 113*c* of the insertion cylinder 113 of the upper portion of FIG. 14 of the ball installation hole 113*b*, an O-ring installation groove 113*d* is provided. The O-ring installation groove 113*d* is provided with an O-ring 117. The O-ring 117 abuts the upper face of the fixed ball 116, at the upper portion of the ball installation hole 113*b*. The fixed ball 116 is always pushed in the direction of the ball installation hole 113*b*, that is, in the direction of the arrow XG (in the axis center XCT direction), due to elasticity of the O-ring 117. Therefore, the fixed ball 116 will not drop out of the ball installation hole 113*b*. The insertion cylinder 113 is provided with a pin mounting portion 113*e* on the circumferential face 113*c* at its right upper portion as seen in FIG. 14. The pin mounting portion 113*e* is provided with a pin 113*f*.

At the opposite side of the clamp pin supporting member 103*a* of the clamping portion main body 103 of the jig 101, that is, on the right side of FIG. 14, a bottom abutting face 103*b* is formed so as to be parallel to the installation reference plane 102*a* of the fixing portion main body 102, and a side abutting face 103*c* is formed so as to be perpendicular to the bottom abutting face 103*b*.

The jig 119 to be used in combination with the jig 101 on the workpiece fixing face 130*a* has a main body 120 of a cylindrical shape, having an installation reference plane 120*a* at its bottom portion as shown in FIG. 14. Among the elements of the jig 119, the same elements as those of the jig 101 are marked with the same numerals, and the explanation of these elements will be omitted. On the circumferential face of the main body 120, the holding groove 102*c* having a V-shaped section is formed. Inside the main body 120, an operation engaging screw 120*b* is provided on an axis center XCT' perpendicular to the installation reference plane 120*a*. The operation screw engaging screw 120*b* is engaged with an operation screw 121, elongated in the directions of the arrows XC' and XD', and moveable in the directions of the arrows XD' and XC' together with rotation in the directions of the arrows XA' and XB'. Furthermore, an operation face 121*a* is provided so as to jut out of a supporting member mounting face 120*c* of the main body 120. The operation face 121*a* is provided with an operation hole 121*b*, having the form of a hexagon in section, so as to receive a wrench or the like having the form of hexagon in section.

On the axis section XCT' of the operation screw engaging screw 120*b* of the main body 120, the main body fixing unit 112 is provided in a similar way as in the case of jig 101. The insertion cylinder 113 of the main body fixing unit 112 has the operation ball sliding hole 113*a* linking with the inner portion of the operation engaging screw 120*b*. An end portion 121*d* of the operation screw 121 juts into the operation ball sliding hole 113*a*. In the operation ball sliding hole 113*a*, the operation ball 115 is provided so as to be movable in the directions of the arrows XC' and XD', abutting the end portion 121*d* of the operation screw 121. On the lower side of the operation ball 115, three fixed balls 116 are provided so as to be movable in the radial direction of the axis center XCT', or in the directions of the arrows XG' and XH' in the ball installation hole 113*b*, abutting the operation ball 115. The fixed ball 116 is supported by the O-ring 117 with which the O-ring installation groove 113*d* is provided so as not drop out of the ball installation hole 113*b*.

On the face 120*c* of the main body 120, four bottom face supporting members 122 are fixed, by a set screw or the like, at intervals of equal angles relative to the axis center XCT', or at 90° intervals, so as to position respective bottom face abutting faces 122*a*, formed on the upper portion of the members 122 on the same plane, parallel to the installation reference face 120*a*.

The jig 125 to be used in combination with the jigs 101 and 119 on the workpiece fixing face 130*a* has a main body 126 in a cylindrical shape, having an installation reference plane 126*a* at the bottom portion in the figure, as shown in FIG. 14. Among the elements of the jig 125, the same elements as those of jig 101 or 119 are marked with the same numerals, and the explanation of these elements will be omitted. On the circumferential face of the main body 126, the holding groove 102*c* having a V-shaped section is formed. Inside the main body 126, an engaging screw 126*b* is provided on an axis center XCT" perpendicular to the installation reference plane 126*a*. The engaging screw 126*b* is engaged with the operation screw 121 as in the case of the jig 119 so as to move the operation screw 121 in the directions of the arrows XD" and XC" together with the rotation in the directions of the arrows XA" and XB". An operation face 121*a* juts out of bottom face supporting member mounting face 126*c* of the main body 126. The operation face 121*a* is provided with an operation hole 121*b*.

In the axis center XCT" of the lower side of the operation screw engaging screw 126*b* of the main body 126 is provided the main body fixing unit 112 in a similar way to the jig 101 or 119. The insertion cylinder 113 of the main body fixing unit 112 has the operation ball sliding hole 113*a* linking with the inner portion of the engaging screw 126*b*. The end portion 121*d* of the lower end of the operation screw 121 juts into the operation ball sliding hole 113*a*. In the operation ball sliding hole 113*a*, the operation ball 115 is movable in the directions of the arrows XC" and XD", so as to abut the end portion 121*d* of the operation screw 121. In the lower side of the operation ball 115, three fixed balls 116 are movable in the radial directions of the axis center XCT", or in the directions of the arrows XG" and XH", in the ball installation hole 113*b* so as to abut the operation ball 115. The fixed balls 116 are supported by the O-ring 117, with which the O-ring installation groove 113*d* in the upper portion of the ball installation hole 113*b* is provided, so as not to drop out of the ball installation hole 113*b*.

On the mounting face 126*c* of the main body 126, the bottom face supporting member 122 is fixed by a set screw or the like so as to have the bottom face abutting face 122*a* formed parallel to the installation reference plane 120*a*. The main body 126 is provided with a side face supporting member mounting face 126*d* on the right side of the bottom face supporting member mounting face 126*c*. On the side face supporting member mounting face 126*d*, two side face supporting members 127 are fixed so as to position side face abutting faces 127*a* on the same plane, perpendicular to the bottom face abutting face 122*a*.

When the insertion cylinder 113 of the jig 119 is inserted in the cylindrical portion 129*a* of the fixed bush 129, a wrench or the like is inserted in the operation hole 121*b* of the operation screw 121, and the operation screw 121 is properly rotated in the direction of the arrow XB' in FIG. 14 so as to move the operation screw 121 upward, in the direction of the arrow XC'. The end portion 121*d* recedes from the operation ball sliding hole 113*a*. Then, the operation ball 115 abutting the end portion 121*d* is movable in the directions of the arrows XC' and XD' in the operation ball sliding hole 113*a*. The fixed balls 116 are pushed and moved in the directions of the arrow XG' so as to jut into the operation ball sliding hole 113*a*, pushing and moving the operation ball 115 in the direction of the arrow XC' due to the elasticity of the O-ring 117. The fixed balls 116 then completely enter inside the circumferential face 113*d* of the insertion cylinder 113.

In the foregoing state, the insertion cylinder 113 is inserted into the cylindrical portion 129*a* of the fixed bush 129 from the workpiece fixing face 130*a* side so as to engage the pin 13*f* with an indexing groove 129*d*. The installation reference plane 120*a* is then abutted on the workpiece fixing face 130*a*.

Next, the operation screw 121 is rotated by the operation hole 121*b* in the direction of the arrow XA' by means of a wrench or the like so as to move the end portion 121*d* in the direction of the arrow XD' jutting into the operation ball sliding hole 113*a*. Then the operation ball 115 is pushed and moved in the direction of the arrow XD' by the end portion 121*d*. Moreover, the operation ball 115 pushes and moves the fixed balls 116 in the operation ball sliding hole 113*a* out of the operation ball sliding hole 113*a* in the direction of the arrow XH'. The fixed balls 116 partly jut out of the circumferential face 113*c* of the insertion cylinder 113 so as to but the conical surface 129*d* of the fixed bush 129. However, since the fixed bush 129 is fixed on the base plate 130 so as not to move upwardly in the figure by the flange 129*b*, the fixed balls 116 move along the conical surface 129*d* in the direction of the arrows XH' and XD'. Therefore, the fixed balls 116 push the insertion cylinder 113, through the ball installation hole 113*b*, in the direction of the arrow XD'. The jig 119 is thus fixed on the workpiece fixing face 130*a* of the base plate 130 so that the installation reference plane 120*a* can adhere to the workpiece fixing face 130*a*. When the fixed balls 116 move along the conical surface 129*d*, the axis center XCT' of the insertion cylinder 113 corresponds with an axis center XCL of the fixed bush 129, due to centripetal force of the insertion cylinder 113 can be used, as long as it is smaller than the inside diameter of the cylindrical portion 129*a* of the fixed bush 129. Thus, it doesn't necessarily follow that the outer diameter of the insertion cylinder 113 corresponds with the inside diameter of the cylindrical portion 129*a*.

After the jig 119 is installed at a predetermined position on the base plate 130 in this way, the insertion cylinder 113 of the jig 125 is inserted in the cylindrical portion 129*a* of the fixed bush 129 so as to install the jig 125 on the base plate 130. In order to do this, in a similar way as in the case of the jig 119, the operation screw 121 is rotated in the direction of the arrow XB" by means of a wrench or the like with the operation hole 121*b* so as to move the operation screw 121 and the operation ball 115 in the direction of the arrow XC". Then the fixed balls 116 are moved in the direction of the arrow XG" so as to fit inside the circumferential face 113*c* of the insertion cylinder 113. The insertion cylinder 113 is then inserted in the cylindrical portion 129*a* of the fixed bush 129 so as to engage the pin 113*f* with some indexing groove 129*c* suitable for the form of the workpiece 135, that is, convenient to face the side face abutting face 127*a* of the side face supporting member 127 toward the left in FIG. 13. The installation reference plane 126*a* is then abutted on the workpiece fixing face 130*a*.

Next, in a similar way as in the case of the jig 119, the operation screw 121 is rotated in the direction of the arrow XA" by a wrench or the like through the operation hole 121*b* so as to move the operation screw 121 and the operation ball 115 in the direction of the arrow XD". Then the fixed balls 116 are moved along the conical surface 129*d* of the fixed bush 129 in the direction of the arrow XH" so as to fix the jig 125 on the workpiece fixing face 130*a* of the base plate 130 in such a manner that the installation reference plane 126*a* adheres to the workpiece fixing face 130*a*.

When the jig 125 is installed on the base plate 130 in this way, the jig 101 is installed in a similar way. In order to do this, a bar spanner or the like is inserted into the operation hole 106*b* of the clutch shaft 106 of the jig 101, and the clutch shaft 106 is pushed and moved in the direction of the arrow XD against the elasticity of the coiled spring 107. Then the engaging projection 106*c* of the clutch shaft 106 moves out of the clutch shaft engaging hole 105*b* of the cam shaft 105 so as to insert in and engage with the clutch shaft engaging hole 111*b* of the main body fixing unit operation pin 111. In the foregoing state, the clutch shaft 106 is rotated in the direction of the arrow XB by means of the wrench or the like. Then the rotation of the clutch shaft 106 is transferred to the main body fixing unit operation pin 111 through both engaging projection 106*c* and clutch shaft engaging hole 111*b*, which both have hexagon-shaped sections. The main body fixing unit operation pin 111 also rotates, being united together with the clutch shaft 106, in the direction of the arrow XB. Since the engaging shaft between the engaging projection 106*c* of the clutch shaft 106 and the clutch shaft engaging hole 105*b* of the cam shaft 105 has been released, the cam shaft 105 doesn't rotate by the rotation of the clutch shaft 106. When the main body fixing unit operation pin 111 rotates in the direction of the arrow XB, the main body fixing unit operation pin 111 moves a distance corresponding to the pitch of the operation screw 111*c* in the direction of the arrow XC, and the end portion 111*d* recedes out of the operation ball sliding hole 113*a* of the insertion cylinder 113. Then the operation ball 115 abutting the end portion 111*d* is movable in the directions of the arrows XC and XD in the operation ball sliding hole 113*a*. The fixed balls 116 are pushed and moved in the direction of the arrow XG so as to jut into the operation ball sliding hole 113*a*, pushing and moving the operation ball 115 in the direction of the arrow XC, due to the elasticity of the O-ring 117. The fixed balls 116 completely enter inside the circumferential face 113*c* of the insertion cylinder 113.

In the above state, the insertion cylinder 113 is inserted in the cylindrical portion 129*a* of the fixed bush 129 from the workpiece fixing face 130*a* side so as to engage the pin 113*f* with some indexing groove 129*c*, facing the clamp pin 109 toward the workpiece 135, or toward the right in FIG. 13. The installation reference plane 102*a* is then abutted on the workpiece fixing face 130*a*.

Next, the clutch shaft 106 is pushed in the direction of the arrow XD so as to fit the engaging projection 106*c* in the clutch shaft engaging hole 111*b* of the main body fixing unit operation pin 111. In this state the clutch shaft 106 and the main body fixing unit operation pin 111 are properly rotated in the direction of the arrow XA, by means of a wrench or the like, by the operation hole 106*b*, so as to move the end portion 111*d* of the main body fixing unit operation pin 111 in the direction of the arrow XD and so as to jut into the operation ball sliding hole 113*a*. Then the operation ball 115 is pushed and moved in the direction of the arrow XD by the end portion 111*d*. Furthermore, the operation ball 115 pushes the fixed balls 116 jutting into the operation ball sliding hole 113*a* out of the operation ball sliding hole 113*a* by pushing them in the direction of the arrow XH. The fixed balls 116 then jut out of the circumferential face 113*c* of the insertion cylinder 113 and abut the conical surface 129*d* of the fixed bush 129, moving along the conical surface 129*d* in the direction of the arrows XH and XD. Therefore the fixed balls 116 push the insertion cylinder 113 in the direction of the arrow XD via the ball installation holes 113*b*. The jig 101 is thus fixed on the workpiece fixing face 130*a* of the base plate 130 in such a manner that the installation reference plane 102*a* adheres to the workpiece fixing face 130*a*.

When the jig 101 is fixed on the workpiece fixing face 130*a*, the pushing of the clutch shaft 106 in the direction of the arrow XD is released. Then the clutch shaft 106 is pushed and moved in the direction of the arrow XC by the coiled spring 107. The engaging projection 106*c* moves out of the clutch shaft engaging hole 111*b* of the main body fixing unit operation pin 111 and engages with the clutch shaft engaging hole 105*b* of the cam shaft 105. In this state, when the clutch shaft 106 is properly rotated in the directions of the arrows XA and XB by means of a wrench or the like through the operation hole 106*b*, the cam shaft 105 also rotates, together with the clutch shaft 106, in the directions of the arrows XA and XB, through both engaging projection 106*c* and engaging hole 106*b* of hexagonal shape. When the cam shaft 105 rotates, the clamp pin 109, abutting and engaging with the cam circumferential face 105*e* due to the elasticity of the coiled spring 110, slides and moves in the directions of the arrows XE and XF along a cam curve formed on the cam circumferential face 105*e*. The cam shaft 105 is rotated so as to position the plate cam 105*d*, at the side of the clamp pin 109, in a position having the least amount of projection of the cam circumferential face 105*e* toward the clamp pin 109. The clamp pin 109 moves in the direction of the arrow XE through the operation portion 109*c* abutting the cam circumferential face 105*e* so as to position the workpiece clamping face 109*b* at a receded position, closest to the left in the figure.

Since the rotation axis XCT of the clutch shaft 106 is perpendicular to the installation reference plane 102*a* and the workpiece fixing face 130*a*, a wrench or the like doesn't interfere with the workpiece fixing face 130*a* when rotating the clutch shaft 106 in the directions of the arrows XA and XB. Accordingly, the operations of the jig 101 can be easily performed.

In this way, the jigs 101, 119 and 125 are fixed on the workpiece fixing face 130*a* in the arrangement as shown in FIGS. 13 and 14. Next, the workpiece 135, as shown with the imaginary line in FIGS. 13 and 14, is positioned on the bottom face abutting face 122*a* of each bottom face supporting member 122 of the jigs 119, and 125 so as to contact the side face abutting face 127*a* of each side face supporting member 127 of the jig 125 with the side face 135*a* of the workpiece 135. A clearance is provided between the workpiece clamping face 109*b* of the clamp pin 109 of each jig 101 and the side face 135*a* of the workpiece 135.

Then the clutch shaft 106 of each jig 101 is properly rotated in the direction of the arrow XA and XB in FIG. 14 by means of a wrench or the like through the operation hole 106*b*, the clutch shaft not being pushed in the direction of the arrow XD. The clutch shaft 106 is energized in the direction of the arrow XC by the coiled spring 107, and the engaging projection 106, of the clutch shaft 106 is engaged with the clutch shaft engaging hole 105*b* of the cam shaft 105. Therefore the cam shaft 105 rotates together with the clutch shaft 106 in the directions of the arrows XA and XB. Then the portion abutting the operation portion 109*c* of the clamp pin 109 of the plate cam 105*d* with which the cam shaft 105 is provided, that is, the cam circumferential face 105*e* on the right side in FIG. 14, displaces an amount corresponding to the rotation angle of the cam shaft 105 toward the right direction in the figure. The clamp pin 109 is pushed and moved in the direction of the arrow XF against the elasticity of the coiled spring 110 by the operation portion 109*c*. The workpiece clamping face 109*b* of the clamp pin 109 then abuts the side face 135*a* of the workpiece 135 so as to clamp the workpiece 135, the clamp pin 109 pushing the workpiece 135 in the direction of the arrow XF. The direction of pushing of the workpiece 135 with the clamp pin 109 is shown by the arrow XE slightly inclining downward in FIG. 14 toward the installation reference plane 102*a* and the workpiece fixing face 130*a*. Therefore the workpiece 135 is pushed toward the workpiece fixing face 130*a* and toward each bottom face supporting member 122 of the jigs 119 and 125, and the workpiece bottom face 135*b* adheres to the bottom face abutting faces 122*a*. Accordingly, relief and chatter of the workpiece 135 can be prevented during machining.

When the installation of the workpiece 135 on the base plate 130 is finished, a tool is installed in a spindle (not shown) facing the workpiece fixing face 130*a* in order to machine the workpiece 135. When the machining of the workpiece 135 finishes, the machined workpiece 135 is detached from the base plate 130.

When the workpiece 135 is detached from the base plate 130, the clutch shaft 106 of a jig 101, among the six jigs 101, 119 and 125 fixing the workpiece 135, is properly rotated together with the cam shaft 105 in the direction of the arrow XA and XB in FIG. 14. A wrench or the like engages the operation hole 106*b* without pushing in the direction of the arrow XD in so that the engaging projection 106*c* is engaged with the clutch shaft engaging hole 105*b* of the cam shaft 105. The amount of projection of the cam circumferential face 150*e* of the plate cam 105*d* contacting the operation portion 109*c* of the clamp pin 109 is reduced together with the rotation of the cam shaft 105. Then the clamp pin 109 moves in the direction of the arrow XE due to the elasticity of the coiled spring 110 so the operation portion 109*c* contacts the cam circumferential face 105*e*. The contact between the workpiece clamping face 109*b* and the side face 135*a* of the workpiece 135 is released. A clearance is then provided between the workpiece clamping face 109*b* and the side face 135*a* so as to enable the detachment of the workpiece 135.

The jigs 101, 119 and 125 are detached from the base plate 130, if necessary.

When the jig 101 is detached from the base plate 130, the clutch shaft 106 is pushed in the direction of the arrow XD against the elasticity of the coiled spring 107 and is properly rotated together with the main body fixing unit operation pin 111 at the operation hole 106*b* by means of a wrench or the like in the direction of the arrow XB in FIG. 14. The engaging projection 106*c* is engaged in the clutch shaft engaging hole 111*b* of the main body fixing unit operation pin 111. The operation screw 111*c* is then moved in the direction of the arrow XC. The end portion 111*d* of the operation screw 111*c* recedes from the operation ball sliding hole 113*a* of the main body fixing unit 112. Then the operation ball 115 becomes movable in the directions of the arrows XC and XD. In the foregoing state, when the whole jig 101 is pulled, the fixing balls 116 jutting in the direction of the arrow XH are pushed and moved in the direction of the arrow XG by the conical surface 129*d* so as to jut into the operation ball sliding hole 113*a*. The operation ball 115 is pushed and moved in the direction of the arrow XC. The fixed balls 116 completely enter inside the circumferential face 113*c* of the insertion cylinder 113. Then the insertion cylinder 113 is smoothly pulled out of the cylindrical portion 129*a* of the fixed bush 129 so as to detach the jig 101 from the base plate 130.

When the jig 119 is detached from the base plate 130, the operation screw 121 is rotated in the direction of the arrow XB′ by means of a wrench or the like at the operation hole 121*b*. The operation screw 121 is moved in the direction of the arrow XC′ so that the operation ball 115 can be movable in the directions of the arrows XC′ and XD′. In the foregoing state, in the same way as described before, the whole jig 119 is pulled so as to pull the insertion cylinder 113 out of the cylindrical portion 129*a* of the fixed bush 129. The jig 119 is then detached from the base plate 130.

In the same way, when the jig 125 is detached from the base plate 130, the operation screw 121 is rotated in the direction of the arrow XB″ by means of a wrench or the like at the operation hole 121*b* so as to move the screw 121 in the direction of the arrow XC″. Thereafter the whole jig 125 is pulled up so as to pull the insertion cylinder 113 out of the cylindrical portion 129*a* of the fixed bush 129. Thus the jig 125 is detached from the base plate 130.

In the above-described embodiment, the jig 125 is used facing the jig 101 to clamp the workpiece 135. However, at the opposite side of the clamp pin 109 on the jig 101, a workpiece supporting portion comprising the bottom face abutting face 103*b* and the side face abutting face 103*c* is provided. Therefore the workpiece 135 can be clamped by facing two jigs 101 toward each other, without using the jig 125, by using the bottom face abutting face 103*b* and the side face abutting face 103*c* instead of the bottom face abutting face 122*a* and the side face abutting face 127*a* of the jig 125. With this arrangement, of course a plurality of the workpieces 135 can be supported in a line on the base plate 130, in such a manner that a plurality of the jigs 101 are arranged at predetermined intervals in the right and left directions in FIG. 13, and one workpiece 135 is supported between the clamp pin 109 and workpiece supporting portion of a pair of the jigs 101.

It has been mentioned that the jig 101 supports only the side face 135*a* of the workpiece 135, and the bottom face 135*b* of the workpiece 135 is supported by the jig 119 to be used with the jig 101. However, the jig 101 can be provided with means to support the bottom face 135*b* of the workpiece 135 so as not to require the use of the jig 119.

The present invention has been explained according to the above embodiments. However the embodiments described in the present specification are not restrictive, but are exemplary of the present invention. Changes and modifications of the present invention will occur to those in the art, and should be considered within the scope of the invention as defined by the attached claims.

We claim:

1. A jig, comprising:
- a main body;
- an engaging shaft provided on said main body so as to be rotatable relative to said main body, said engaging shaft having a central axis about which said engaging shaft rotates;
- a moving body, and an engaging means formed on said engaging shaft for engaging said moving body with said engaging shaft and moving said moving body along said central axis in response to rotation of said engaging shaft;
- a main body fixing means for fixing said main body in place, said main body fixing means being operably connected with said moving body so as to be driven and actuated by movement of said moving body;
- a workpiece clamping portion for clamping a workpiece, and a workpiece clamping portion actuating means for actuating said workpiece clamping portion to clamp a workpiece, said workpiece clamping portion actuating means being disposed on said engaging shaft and driving said workpiece clamping portion forward and backward in response to rotation of said engaging shaft.

2. The jig as set forth in claim 1, wherein said main body fixing means comprises:
- an engaging member engaging said moving body so as to be moved and driven thereby in a direction intersecting said central axis of said engaging shaft in response to movement of said moving body along said central axis; and
- engaging ball means for radial movement relative to said direction intersecting said central axis in response to movement of said engaging member to engage or disengage from a support.

3. The jig as set forth in claim 1, wherein:
- said workpiece clamping portion actuating means is a cam mechanism engaging with said workpiece clamping portion.

4. The jig as set forth in claim 3, wherein said cam mechanism comprises a cam surface on said engaging shaft and a ball riding on said cam surface and in engagement with said workpiece clamping portion.

5. The jig as set forth in claim 15, wherein:
- said workpiece clamping portion actuating means is a screw engaged with said workpiece clamping portion.

6. The jig as set forth in claim 1, wherein said moving body comprises a nut threadedly engaged with said engaging shaft.

7. The jig as set forth in claim 1, wherein said main body fixing means comprises:
- a cylindrical portion extending from said main body, said cylindrical portion having a channel extending axially therethrough and a plurality of ball holes extending radially therethrough;
- a plurality of balls disposed in respective said ball holes;
- an O-ring for biasing said balls in said ball holes radially inwardly of said cylindrical portion; and
- an engaging member disposed in said channel for axial movement therein in response to movement of said moving body to radially push out or allow retraction of said balls in said ball holes.

8. A jig, comprising:
- a main body, said main body having an installation reference plane defined by a lower surface thereof;
- a cam shaft disposed with said main body so as to be rotatable relative to said main body;
- a clamping means for clamping a workpiece disposed on said main body such that said clamping means is free to project and retract relative to said main body, said clamping means being engaged with said cam shaft for projection and retraction;
- a fixing operation body threadedly engaged with said main body such that rotation of said fixing operation body moves said fixing operation body along its axis;
- a fixing means for fixing said main body in place, said fixing means being actuated by said movement of said fixing operation body to engage or disengage from a support; and
- a clutch means comprising a shaft for selectively engaging with said cam shaft and said fixing operation body, said shaft of said clutch means being rotatable about an axis perpendicular to said installation reference plane.

9. The jig as set forth in claim 8, wherein at least a part of the circumference of said main body has a circular shaped portion, and a holding groove is provided on said circular shaped portion.

10. The jig as set forth in claim 8, wherein:
- said cam shaft rotates about an axis perpendicular to said installation reference plane; and
- said clamping means projects and retracts in a direction inclined at an angle relative to said installation reference plane.

11. The jig as set forth in claim 8, wherein said fixing means comprises:
- engaging ball means for radial movement relative to the axis of said fixing operation body, said engaging ball means engaging with and radially moving in response to movement of said fixing operation body along its axis to engage or disengage from a support.

12. The jig as set forth in claim 8, wherein:

said cam shaft rotates about an axis perpendicular to said installation reference plane; and said fixing operation body and said shaft of said clutch means are disposed in said cam shaft.

13. The jig as set forth in claim 8, wherein:

said clutch means is disposed in said cam shaft;

a spring is disposed in said cam shaft biasing said shaft of said clutch means into a position engaging with said cam shaft; and said shaft of said clutch means is linearly moveable along its axis from said position engaging with said cam shaft to engage with said fixing operation body.

14. The jig as set forth in claim 8, wherein:

said clamping means comprises a clamping member reciprocably mounted in said main body and has a first end engaged with said cam shaft and a second end for engagement with a workpiece.

15. The jig as set forth in claim 14, wherein said clamping member is inclined such that said second end is closer to said installation reference plane the further said clamping member is projected from said main body.

16. The jig as set forth in claim 8, wherein said fixing means comprises:

a cylindrical portion extending from said main body, said cylindrical portion having a channel extending axially therethrough and a plurality of ball holes extending radially therethrough;

a plurality of balls disposed in respective said ball holes; and an O-ring for biasing said balls in said ball holes radially inwardly of said cylindrical portion;

wherein movement of said fixing operation body along its axis radially pushes out or allows retraction of said balls in said ball holes.

17. The jig as set forth in claim 16, wherein said fixing operation body and said plurality of balls in said ball holes have a further ball therebetween.

18. A jig arrangement, comprising:

a base plate and a workpiece fixing apparatus, said base plate having a mounting face, and said workpiece fixing apparatus having a surface defining an installation reference plane;

a plurality of mounting holes on said mounting face of said base plate;

a mounting portion on said surface of said workpiece fixing apparatus for insertion into a said mounting hole of said base plate;

a clutch shaft rotatably disposed inside said workpiece fixing apparatus;

a mounting means on said mounting portion for disengageably engaging with said mounting hole;

actuating means disposed between said clutch shaft and said mounting means for converting rotary motion of said clutch shaft into reciprocatory motion and actuating said mounting means with said reciprocatory motion;

a workpiece clamping means for clamping a workpiece, said clamping means disposed to project and retract in a workpiece clamping direction; and a cam means on said clutch shaft for transferring rotation of said clutch shaft to said workpiece clamping means, wherein said workpiece clamping means projects and retracts in response to rotation of said cam means by said clutch shaft.

* * * * *

UNITED STATES PATENT AND TRADEMARK OFFICE

CERTIFICATE OF CORRECTION

PATENT NO. : 5,035,410

DATED : July 30, 1991

INVENTOR(S) : Norihiko Shimizu, Kanji Sato, Toru Saiki, Kunio Goto, Masuo Matsubara and Niroshi Wada.

It is certified that error appears in the above-identified patent and that said Letters Patent is hereby corrected as shown below:

ON THE TITLE PAGE:

Item [30] priority application No. 1-76487 to read 1-176487.

Signed and Sealed this

Tenth Day of November, 1992

*Attest:*

DOUGLAS B. COMER

*Attesting Officer* *Acting Commissioner of Patents and Trademarks*